United States Patent
Altherr

(10) Patent No.: US 7,925,053 B2
(45) Date of Patent: Apr. 12, 2011

(54) MOTION DETECTION METHOD, MOTION DETECTION PROGRAM, STORAGE MEDIUM IN WHICH MOTION DETECTION PROGRAM IS STORED, AND MOTION DETECTION APPARATUS

(75) Inventor: Jean-Aymeric Altherr, Tokyo (JP)

(73) Assignee: Sony Corporation, Tokyo (JP)

(*) Notice: Subject to any disclaimer, the term of this patent is extended or adjusted under 35 U.S.C. 154(b) by 972 days.

(21) Appl. No.: 11/762,329

(22) Filed: Jun. 13, 2007

(65) Prior Publication Data

US 2008/0107307 A1 May 8, 2008

(30) Foreign Application Priority Data

Jun. 15, 2006 (JP) ................ P2006-165569

(51) Int. Cl.
*G06K 9/00* (2006.01)
*G06K 9/36* (2006.01)
(52) U.S. Cl. ............... 382/107; 382/236; 348/208.99; 348/E5.031
(58) Field of Classification Search .......... 382/107, 382/236; 348/208.99, E5.031
See application file for complete search history.

(56) References Cited

U.S. PATENT DOCUMENTS

| 6,456,660 | B1* | 9/2002 | Yokoyama | 375/240.16 |
| 6,904,173 | B2* | 6/2005 | Bagni et al. | 382/236 |
| 7,075,988 | B2* | 7/2006 | Lee et al. | 375/240.16 |
| 7,613,321 | B2* | 11/2009 | Altherr et al. | 382/103 |
| 2004/0120548 | A1* | 6/2004 | Qian | 382/103 |

FOREIGN PATENT DOCUMENTS

JP 2004-229084 8/2004

* cited by examiner

*Primary Examiner* — Bhavesh M Mehta
*Assistant Examiner* — Stephen R Koziol
(74) *Attorney, Agent, or Firm* — Finnegan, Henderson, Farabow, Garrett & Dunner, L.L.P.

(57) ABSTRACT

In a method of detecting motion of a particular part from a sequence of successive input images, motion vectors of a plurality of parts of the input images are detected by tracking feature points in the successive input images, the motion of the particular part is detected by processing the motion vectors. The motion detection is performed by producing a histogram of the motion vectors, detecting a peak corresponding to the particular part from the histogram; classifying feature points into a class of feature points belonging to the peak detected in the histogram processing step and a class of the other feature points, and calculating motion of the particular part by analysing the motion vectors belonging to the peak detected in the histogram processing step. The histogram processing step includes detecting the peak corresponding to the particular part on the basis of the class information defined for feature points.

27 Claims, 36 Drawing Sheets

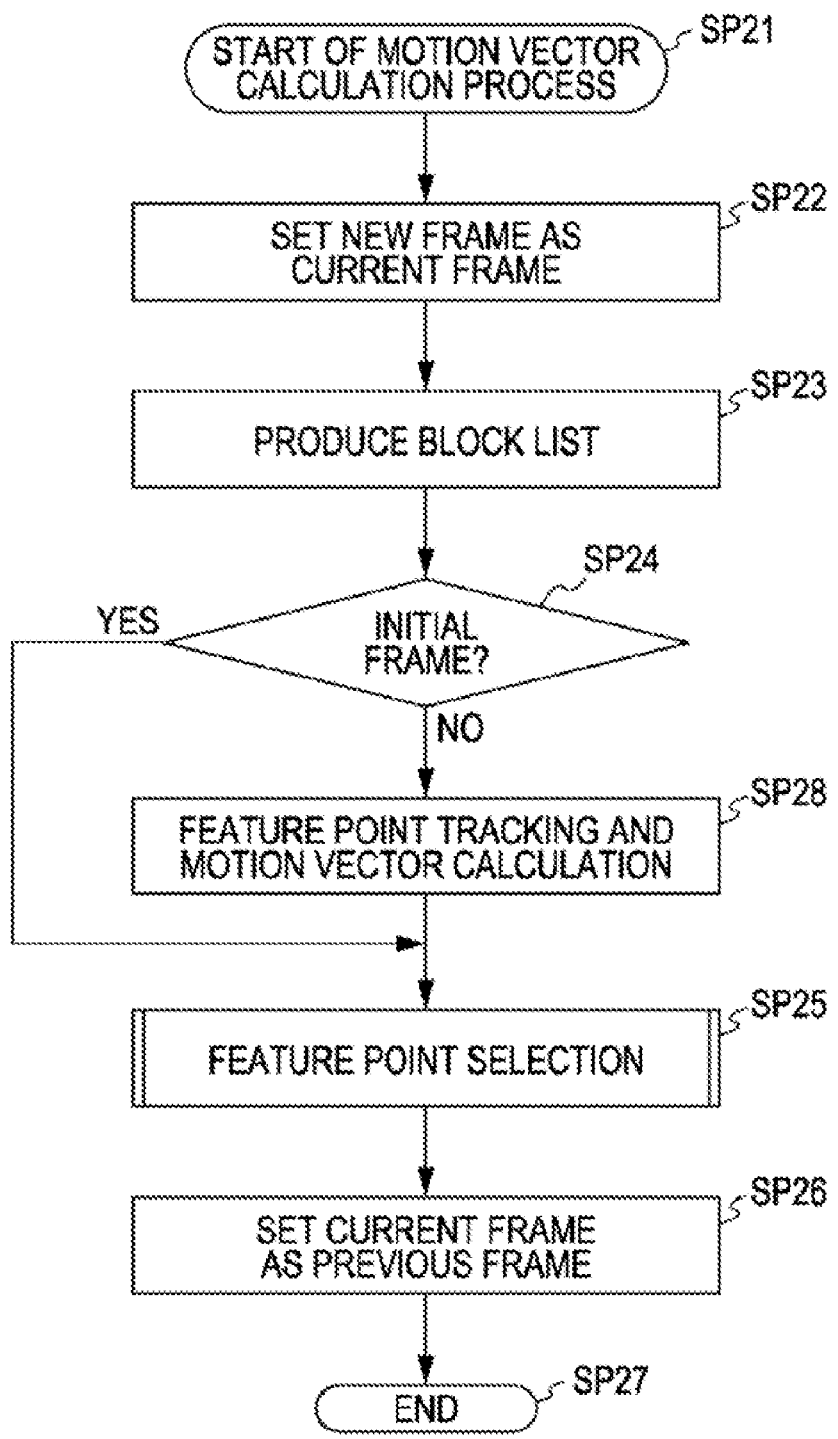

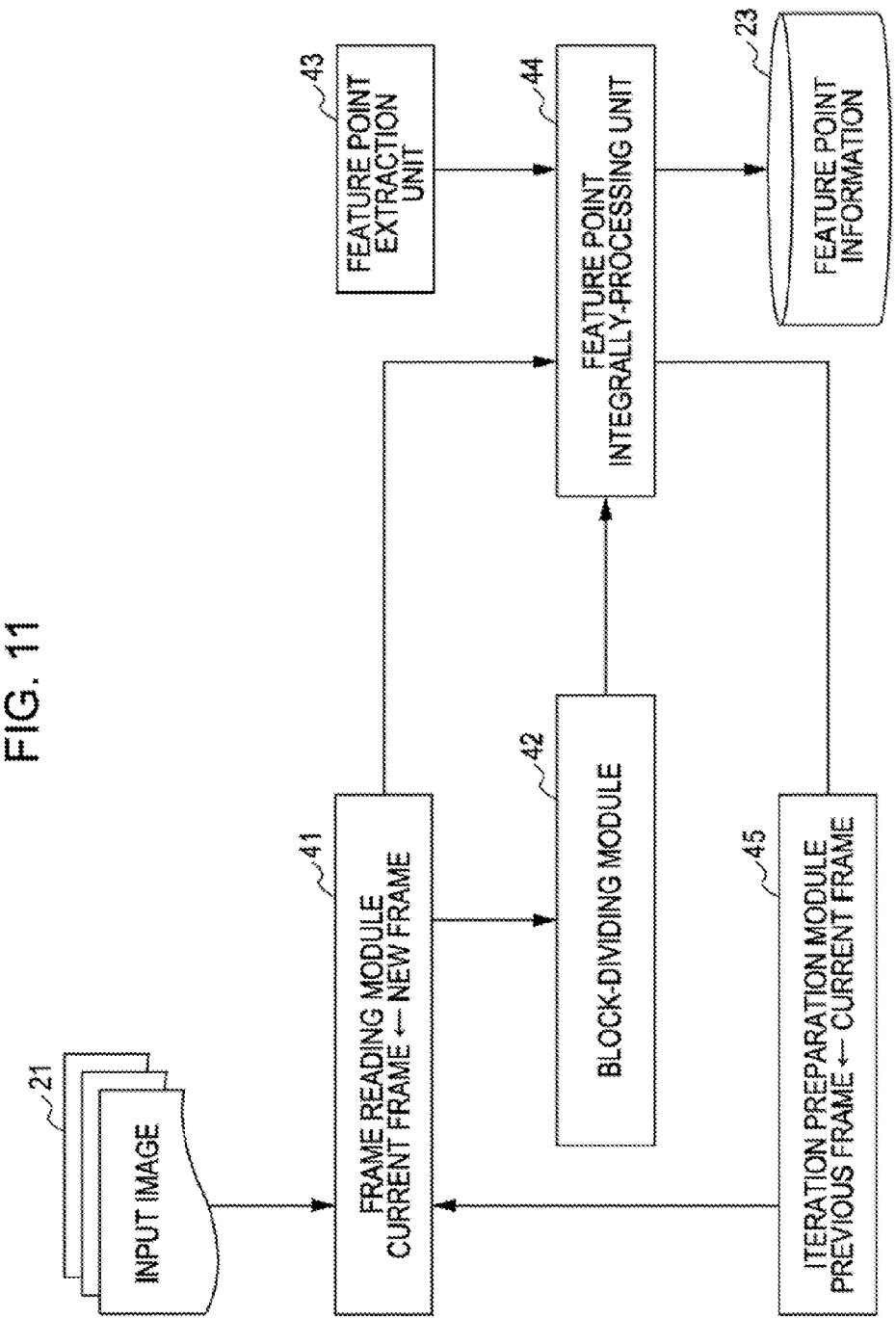

FIG. 20A

| BLOCK NUMBER | b1 | b2 | b3 | b4 | b5 | b6 | b7 | b8 | b9 |
|---|---|---|---|---|---|---|---|---|---|
| NUMBER OF FEATURE POINTS | 10 | 0 | 8 | 1 | 5 | 4 | 3 | 5 | 1 |

(Nfp=6, Ntot=60)

FIG. 20B

| BLOCK NUMBER | b2 | b4 | b5 | b6 | b7 | b8 | b9 |
|---|---|---|---|---|---|---|---|
| NUMBER OF FEATURE POINTS | 0 | 1 | 5 | 4 | 3 | 5 | 1 |

FIG. 20C

| GROUP NUMBER | G1 | G2 | | G3 | G4 | G5 | |
|---|---|---|---|---|---|---|---|
| BLOCK NUMBER | b2 | b4 | b9 | b7 | b6 | b5 | b8 |
| NUMBER OF FEATURE POINTS | 0 | 1 | 1 | 3 | 4 | 5 | 5 |

FIG. 20D

| GROUP NUMBER | G2 | | | G3 | G4 | G5 | |
|---|---|---|---|---|---|---|---|
| BLOCK NUMBER | b4 | b9 | b2 | b7 | b6 | b5 | b8 |
| NUMBER OF FEATURE POINTS | 1 | 1 | 1 | 3 | 4 | 5 | 5 |

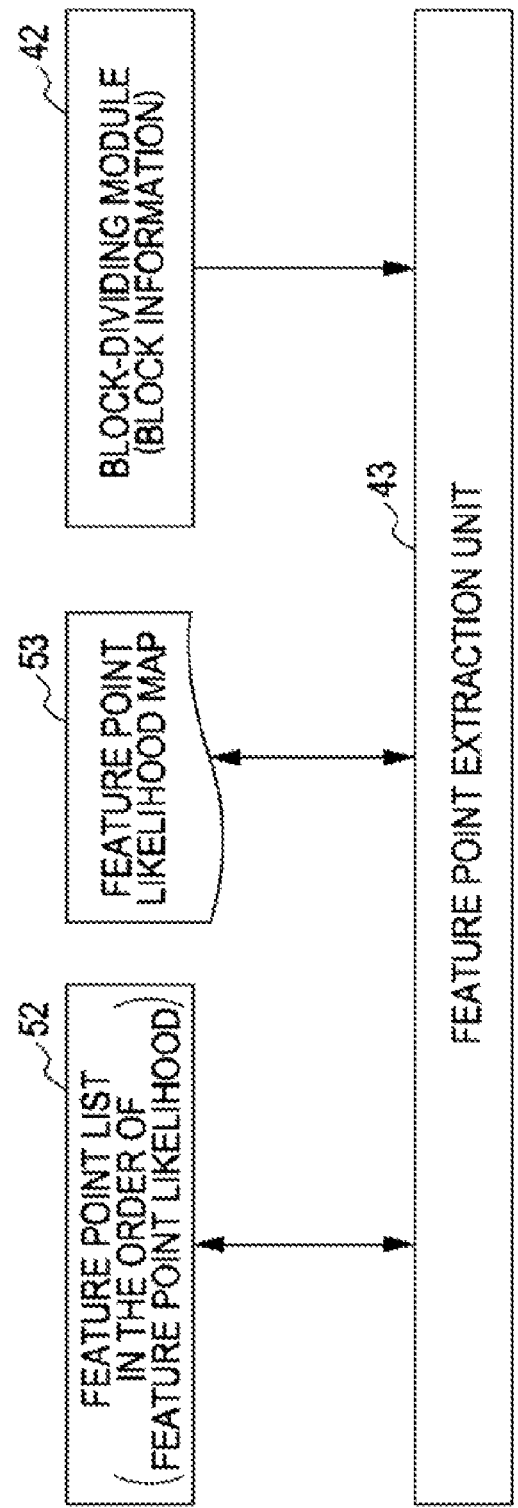

FIG. 24

| NO | CONTENTS |
|---|---|
| 1 | COORDINATES (x, y) [FLOATING-POINT]<br>FEATURE POINT LIKELIHOOD [INTEGER]<br>INDICATING WHETHER FEATURE POINT IS VALID OR INVALID (BOOLEAN)<br>MOTION VECTOR<br>CLASS INFORMATION: [BACKGROUND FEATURE POINT], [NON-BACKGROUND FEATURE POINT], [UNCLASSIFIED]<br>⋮ |
| 2 | COORDINATES (x, y)<br>FEATURE POINT LIKELIHOOD<br>VALID/INVALID FLAG<br>MOTION VECTOR<br>CLASS INFORMATION<br>⋮ |
| ⋮ | ⋮ |

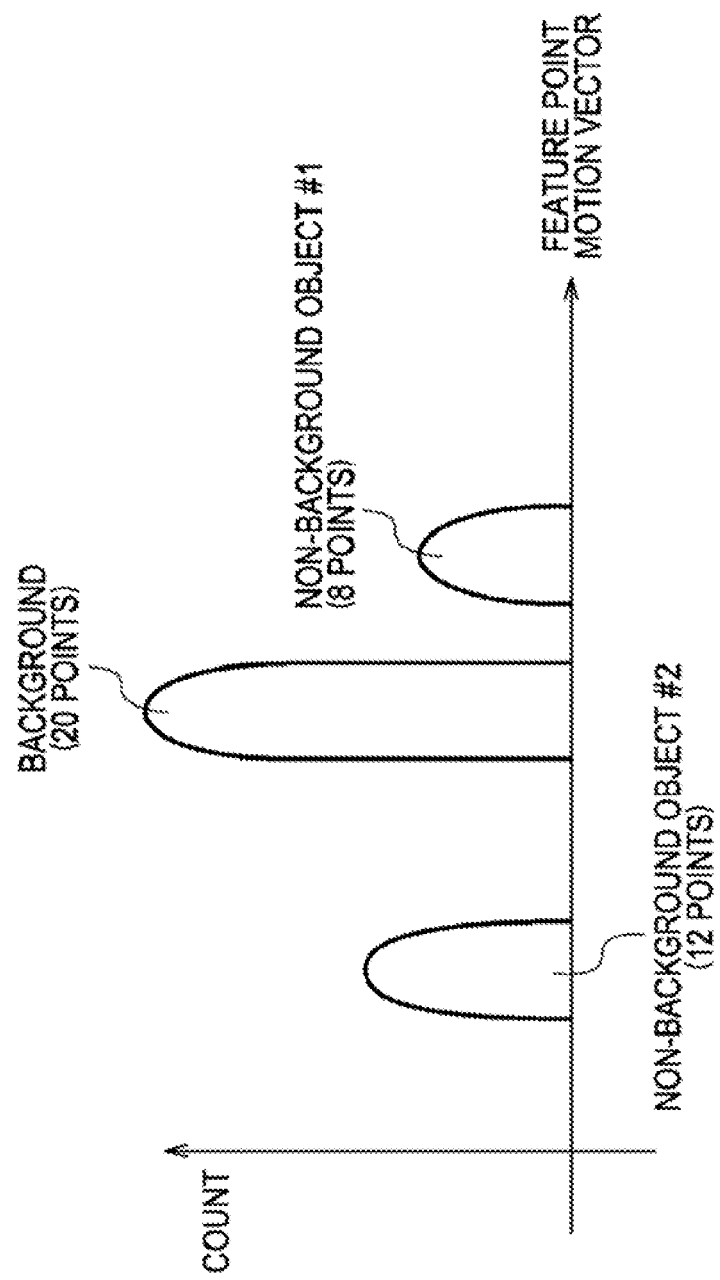

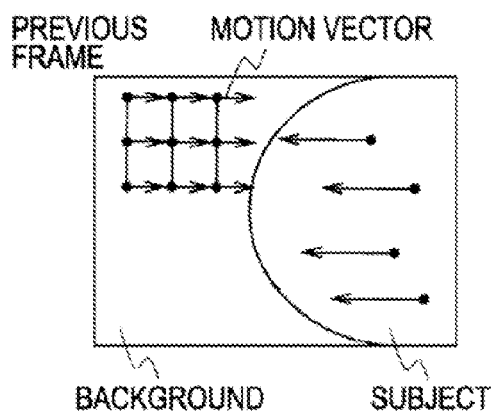
FIG. 37A1
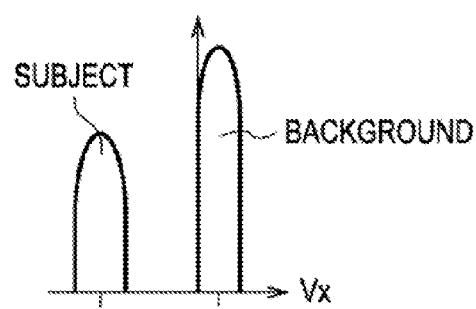
FIG. 37A2
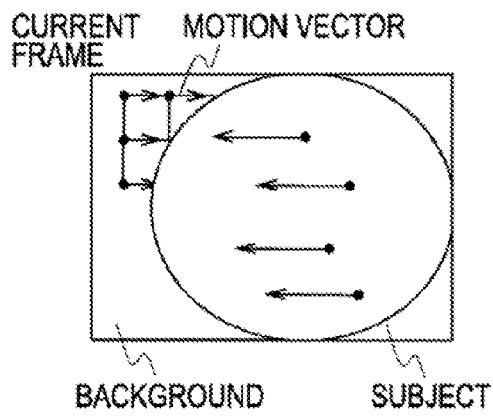
FIG. 37B1
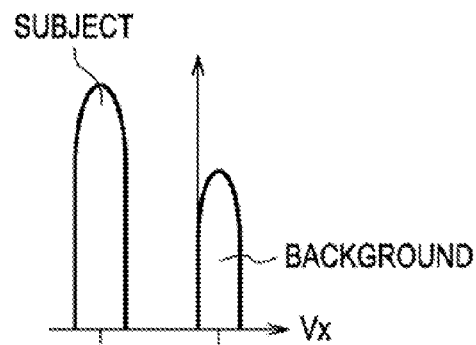
FIG. 37B2

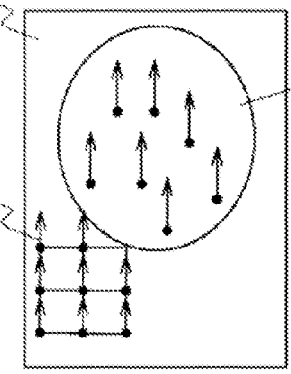
FIG. 38A1
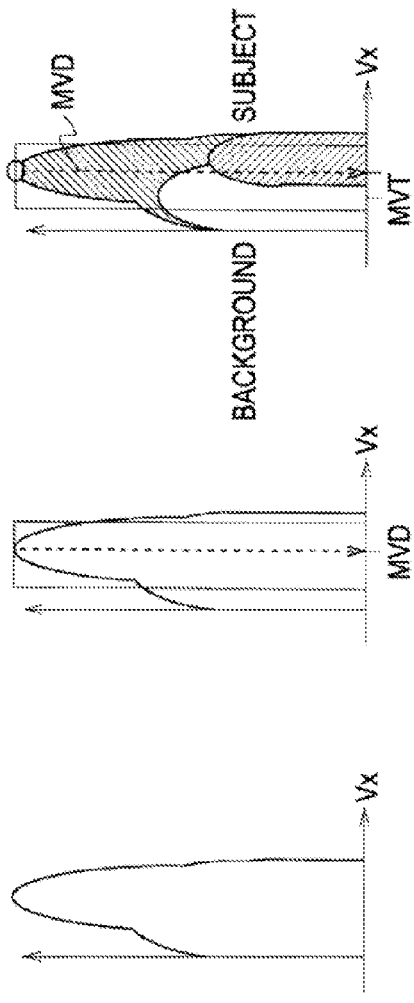
FIG. 38B1
FIG. 38B2
FIG. 38B3

MOTION DETECTION METHOD, MOTION DETECTION PROGRAM, STORAGE MEDIUM IN WHICH MOTION DETECTION PROGRAM IS STORED, AND MOTION DETECTION APPARATUS

CROSS REFERENCES TO RELATED APPLICATIONS

The present invention contains subject matter related to Japanese Patent Application JP 2006-165569 filed in the Japanese Patent Office on Jun. 15, 2006, the entire contents of which are incorporated herein by reference.

BACKGROUND OF THE INVENTION

1. Field of the Invention

The present invention relates to a motion detection method, a motion detection progress, a storage medium in which at motion detection programs is stored, and a motion detection apparatus, applicable, for example, to a camera-shake compensation process using motion vectors. More specifically, a histogram of motion vectors detected at feature points in various parts of an input image is produced, and motion vectors are classified based on the histogram. The motion of a particular part is detected based on motion vectors detected in the particular part. Motion vectors are classified based on class information indicating a class determined in the past for each motion vector, and the motion of the camera is detected based on the motion vectors detected in various parts of the screen, thereby achieving an improvement in detection accuracy of the motion of the camera.

2. Description of the Related Art

If is known to process an image based on motion vectors. For example, Japanese Unexamined Patent Application Publication No. 2004-229084 discloses a technique for compensating for camera shake by using motion vectors. In such a known technique for compensating for camera shake by using motion vectors, motion of a camera is detected based on a motion vector of a background image extracted from motion vectors of various parts of an image, the motion of the camera due to hand shake is extracted from the detected camera motion, and the motion of the camera due to hand shake is compensated for.

In the technique to compensate for camera shake by using motion vectors, two assumptions are made in detecting motion vectors of a background from motion vectors of various parts on a screen. A first assumption is that any part of a background moves in the same way relative to the motion of a camera, and a second assumption is that the background occupies a greatest area on the screen.

More specifically, in this technique, a two-dimensional histogram of motion vectors of various parts on the screen is produced such that horizontal components of motion vectors are represented along an X axis and vertical components are represented along a Y axis. A greatest peak of a distribution motion vectors on the histogram is detected, and a group of motion vectors with the greatest peak on the histogram is regarded as the group of motion vectors of a background. The distribution of motion vectors on the histogram has a mountain-like shape around a peak. Thus, hereinafter, when a segment of the histogram includes a peak, the segment will be referred to simply as a mountain-like distribution segment or further simply as a peak if no confusion occurs. In this method, the average of motion vectors belonging to the group corresponding to the background is calculated, and a vector obtained by inverting the sing of the average of motion vectors is used to represent the motion of the camera.

More specifically, as in an example shown in FIGS. 35A and 35B, when a given image includes two persons moving at different speeds in a horizontal direction, if a camera is panned in the same direction as that of the movement of the persons at a speed different from the speeds of the persons, then motion vectors are detected in various parts on the screen as represented by arrows in FIG. 35E. In the example shown in FIG. 35B, eight motion vectors are detected for one person, twelve motion vectors are detected for the other person, and twenty motion vectors are detected for a background.

In the present example, if a histogram of these motion vectors is produced, then in the resultant histogram, as shown in FIG. 36, mountain-like distribution segments of motion vectors detected from the respective two persons and a mountain-like distribution segment of motion vectors detected from the background appear. For simplicity, in FIG. 36 (and elsewhere in the present description), only the horizontal components are shown in the histogram.

On the histogram, if motion vectors are detected evenly over the entire screen in any frame, then numbers of motion vectors detected from the background and two persons are proportional to the respective areas occupied on the previous and current frames by the background and the two persons. Because the background is solid, the motion vectors detected from the background are similar to each other. Thus, if it is assumed that the background occupies the greatest area on the screen, a mountain-like distribution segment having a greatest height of the three mountain-like distribution segments is a mountain-like distribution segment of motion vectors detected from the background. In other words, it is possible to detect the mountain-like distribution segment of motion vectors detected from the background by detecting a mountain-like distribution segment having a greatest height. In the example shown in FIG. 36, two mountain-like distribution segments are produced on the histogram from eight motion vectors and twelve motion vectors detected from the respective two persons, and a mountain-like distribution segment is produced from, twenty motion vectors detected from the background.

However, in this technique, depending on the given image, there is a possibility that the motion of the camera cannot be correctly detected. For example, as shown in FIGS. 37A1, 37A2, 37B1, and 37B2, depending on the situation in which the image is taken, the area of a background can become very small for a short time. In this case, the second assumption described above does not hold. Note that in FIGS. 37A1, 37A2, 37B1, and 37B2, images of previous and current frames and histograms thereof are shown. In this example, the background has a large area relative to that of a subject in the previous frame (FIG. 37A1). However, in the current frame, as a result of movement of the subject, the area of the background is smaller than that of the subject (FIG. 37B1). Correspondingly, in the histogram of the previous frame, the background has a mountain-like distribution segment with a greater height (FIG. 37A2), but in the current frame, the background has a mountain-like distribution segment with a smaller height (FIG. 37B2). Thus, in this example, if the mountain-like distribution segment having the greater height is selected as the mountain-like distribution segment of the background, an error occurs in detection of the background and thus it is difficult to correctly detect the motion of the camera. Note that in FIGS. 37A1 and 37B1, motion vectors are represented by arrows.

In another example shown in FIGS. 38A1, 38B1, 38B2, and 38B3, a background and a subject move in a similar manner.

In this case, a mountain-like distribution segment corresponding to the subject and a mountain-like distribution segment corresponding to the background partially overlap on a histogram. The overlapping makes it difficult to correctly distinguish between these two mountain-like distribution segments, and thus difficult to correctly detect the motion of the background. Note that in the example shown in FIGS. 38A1, 38B1, 38B2, and 38B3, the movement of the subject is going to stop, and there is a difference between the motion of the background and the motion of the subject although the difference is small. In this case, on the histogram, the mountain-like distribution segment corresponding to the background and the mountain-like distribution segment corresponding to the subject overlap with a slight deviation, and it is very difficult to distinguish between the motion of the background and the motion of the subject (FIGS. 38B1 and 38B2).

Thus, the real motion denoted by MVT is incorrectly detected as denoted by MVD (FIG. 38B3). If such an error in detection occurs over several frames, a cumulative error can be as large as few ten pixels even if an error is small such as a few pixels in each frame.

SUMMARY OF THE INVENTION

In view of the above, it is desirable to provide a motion detection method, a motion detection program, a storage medium in which a motion detection programs is stored, and a motion detection apparatus, adapted to detect motion of a camera or the like with high accuracy on the basis of motion vectors detected in various parts of a screen.

According to an embodiment of the present invention, there is provided a method of detecting motion of a particular part from a sequence of successive input images, comprising the steps of detecting motion vectors of a plurality of parts of the input images by tracking feature points in the successive input images, and detecting the motion of the particular part by processing the motion vectors, the motion detection step including producing a histogram of the motion vectors, processing the histogram such that a mountain-like distribution segment each having a peak at which a frequency distribution of motion vectors has a maximum in the histogram are classified, and a mountain-like distribution segment corresponding to the particular part is detected, defining class information for each feature point to indicate whether each feature point belongs or does not belong to the mountain-like distribution segment detected in the histogram processing step, and calculating motion of the particular part by analysing the motion vectors belonging to the mountain-like distribution segment detected in the histogram processing step, the histogram processing step including detecting the mountain-like distribution segment corresponding to the particular part on the basis of the class information defined for feature points.

According to an embodiment, of the present invention, there is provided a program executable by processing means to implement a method of detecting motion of a particular part from a sequence of successive input images, the program comprising the steps of detecting motion vectors of a plurality of parts of the input images by tracking feature points in the successive input images, and detecting the motion of the particular part by processing the motion vectors, the motion detection step including producing a histogram of the motion vectors, processing the histogram such that a mountain-like distribution segment each having a peak at which a frequency distribution of motion vectors has a maximum in the histogram are classified, and a mountain-like distribution segment corresponding to the particular part is detected, defining class information for each feature point to indicate whether each feature point belongs or does not belong to the mountain-like distribution segment detected in the histogram processing step, and calculating motion of the particular part by analysing the motion vectors belonging to the mountain-like distribution segment detected in the histogram processing step, the histogram processing step including detecting the mountain-like distribution segment corresponding to the particular part on the basis of the class information defined for feature points.

According to an embodiment of the present invention, there is provided a storage medium in which a program is stored, the program being executable by processing means to implement a method of detecting motion of a particular part from a sequence of successive input images, the program comprising the steps of detecting motion vectors of a plurality of parts of the input images by tracking feature points in the successive input images; and detecting the motion of the particular part by processing the motion vectors, the motion detection step including producing a histogram of the motion vectors, processing the histogram such that a mountain-like distribution segment each having a peak at which a frequency distribution of motion vectors has a maximum in the histogram are classified, and a mountain-like distribution segment corresponding to the particular part is detected, defining class information for each feature point to indicate whether each feature point, belongs or does not belong to the mountain-like distribution segment detected in the histogram processing step, and calculating motion of the particular part by analysing the motion vectors belonging to the mountain-like distribution segment detected in the histogram, processing step, the histogram processing step including detecting the mountain-like distribution segment corresponding to the particular part on the basis of the class information defined for feature points.

According to an embodiment of the present invention, there is provided a motion detection apparatus configured to detect motion of a particular part from a sequence of successive input images, the apparatus comprising a motion vector detection unit configured to detect motion vectors of a plurality of parts of the input images by tracking feature points in the successive input images, and a motion detection unit configured to detect the motion of the particular part by processing the motion vectors, the motion detection unit including a histogram producing unit configured to produce a histogram of the motion vectors, a histogram processing unit configured to process the histogram such that, a mountain-like distribution segment each having a peak at which a frequency distribution of motion vectors has a maximum in the histogram are classified, and a mountain-like distribution segment corresponding to the particular part is detected, a feature point classifying unit configured to classify feature points into a class of feature points belonging to the mountain-like distribution segment detected by the histogram processing unit, and a class of the other feature points, and a motion calculating unit configured to calculate motion of the particular part by analysing the motion vectors belonging to the mountain-like distribution segment detected by the histogram processing unit, the histogram processing unit configured to detecting the mountain-like distribution segment corresponding to the particular part on the basis of the class information defined for feature points.

In the method, apparatus, and the program, as described above, the mountain-like distribution segment corresponding to the particular part can be detected in accordance with the class information indicating a class determined in the past for each motion vector. When the particular part is a background, even if a reduction in the area occupied by the background on the screen occurs, the mountain-like distribution segment corresponding to the background can be correctly detected by tracking the background varying in area. Thus, very high accuracy is achieved in detection of motion of a camera by using motion vectors of various parts of the screen.

BRIEF DESCRIPTION OF THE DRAWINGS

FIG. 10 is a flow chart showing a motion vector calculation process;

FIG. 11 is a functional block diagram corresponding to the process shown in FIG. 10;

FIGS. 20A to 20D are tables illustrating data associated with the process shown in FIG. 18;

FIG. 23 is a functional block diagram corresponding to the process shown in FIG. 22;

FIG. 24 is a table illustrating feature point information;

FIG. 36 is a histogram produced in the example shown in FIG. 35;

FIGS. 37A1, 37A2, 37B1 and 37B2 are diagrams illustrating an example in which a reduction in area of a background occurs; and FIGS. 38A1, 38B1, 38B2, and 33B3 are diagrams illustrating an example in which a subject and a background move in a similar manner.

DESCRIPTION OF THE PREFERRED EMBODIMENTS

The present invention is described in further detail below with reference to specific embodiments in conjunction with the accompanying drawings.

First Embodiment

Configuration

Figure 1:
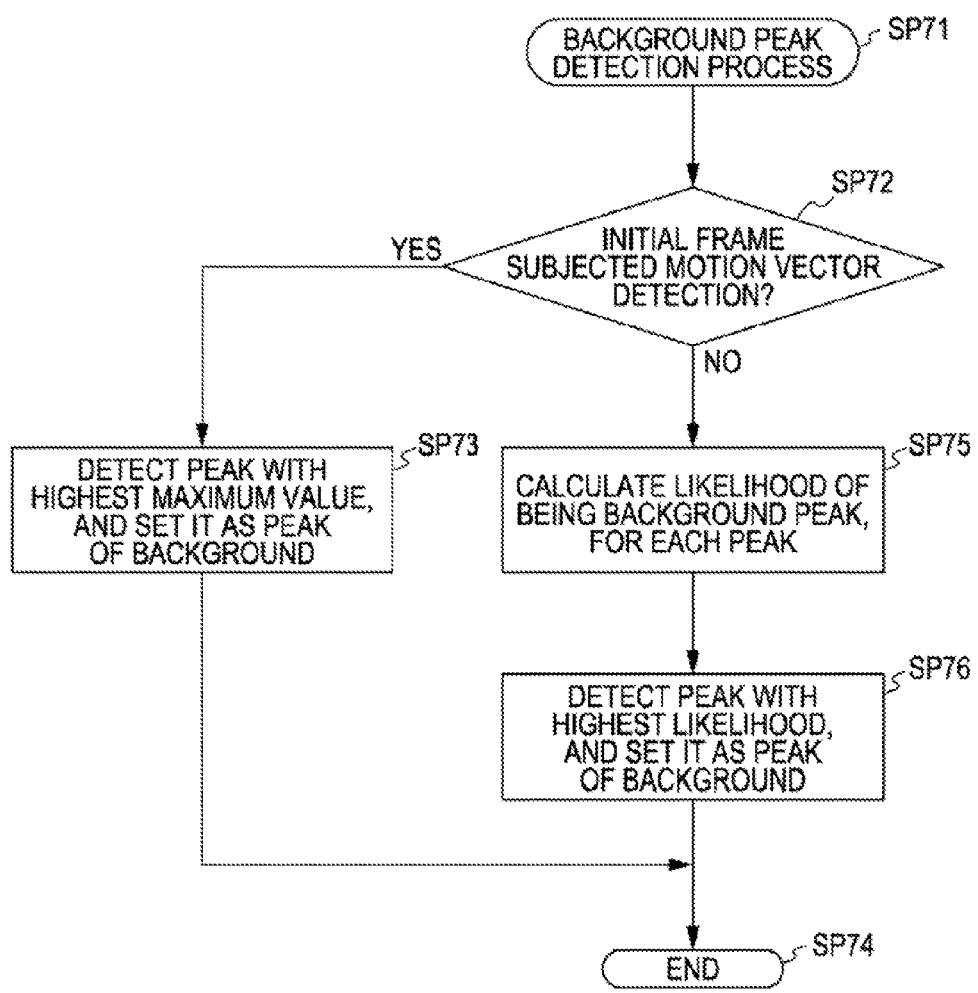
FIG. 1 is a flow chart showing a background peak detection process performed by a camera shake compensation apparatus according to an embodiment of the present invention.

FIG. 1 is a block diagram showing an image processing apparatus functioning as a camera shake compensation apparatus according to a first embodiment of the present invention. The camera shake compensation apparatus 1 is adapted to download a video signal SV captured by a television camera 2 and store it in a hard disk drive (HDD) 3. The camera shake compensation apparatus 1 is also adapted to make correction in terms of camera shake on the video signal SV stored in the hard disk drive 3 and output resultant video signal SV to an external device.

In this camera shake compensation apparatus 1, a central processing unit (CPU) 4 allocates a work area in a random access memory (RAM) 6 in accordance with a program/data stored in a read only memory (ROM) 5, and performs a camera shake compensation process on the video signal SV by executing a processing program stored in a hard disk drive 3. In this process, a graphical user interface is displayed on a monitor 9 to allow a user to input a command/data via the graphical user interface, and a result of camera shake compensation is displayed thereon. An interface (I/F) 10 is an input/output circuit adapted to input/output the video signal SV. The program executed by the CPU 4 may be preinstalled in the camera shake compensation apparatus 1. Alternatively, the program may be stored in a storage medium such as an optical disk, a magnetic disk, or a memory card, and the program may be installed into the camera shake compensation apparatus 1 from the storage medium, or the program may be downloaded via a network such as the Internet.

Figure 3:
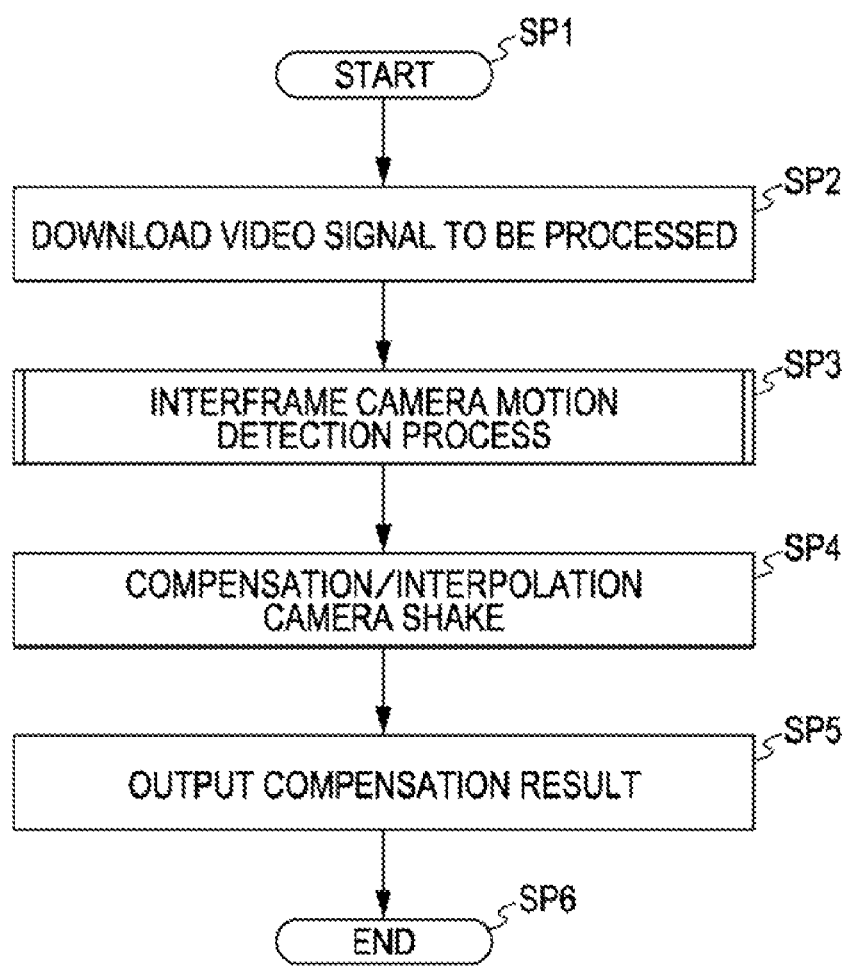
FIG. 3 is a flow chart showing a process performed by a central processing unit in the camera shake compensation apparatus shown in FIG. 2.

FIG. 3 is a flow chart showing a process performed by the CPU 4. The CPU 4 starts the process shown in FIG. 3 in response to an operation performed by a human operator. If the process is started, the processing flow proceeds from step SP1 to step SP2. In step SP2, the CPU 4 downloads a file of a video signal SV specified by a user from the television camera 2 and stores the file in a hard disk drive 3.

Next, in step SP3, the CPU 4 performs a frame-to-frame camera motion calculation process in which a camera motion vector MVCT indicating motion of the television camera 2 represented on the image of the video signal SV is detected by processing the video signal SV stored in the hard disk drive 3. More specifically, the CPU 4 reads the video signal SV frame by frame from the hard disk drive 3 while performing an IP conversion, and detects interframe motion vectors. The IP conversion refers to a conversion from interlace scanning to progression scanning, and the IP conversion may be performed when the video signal is stored in the hard disk drive 3.

Figure 4:
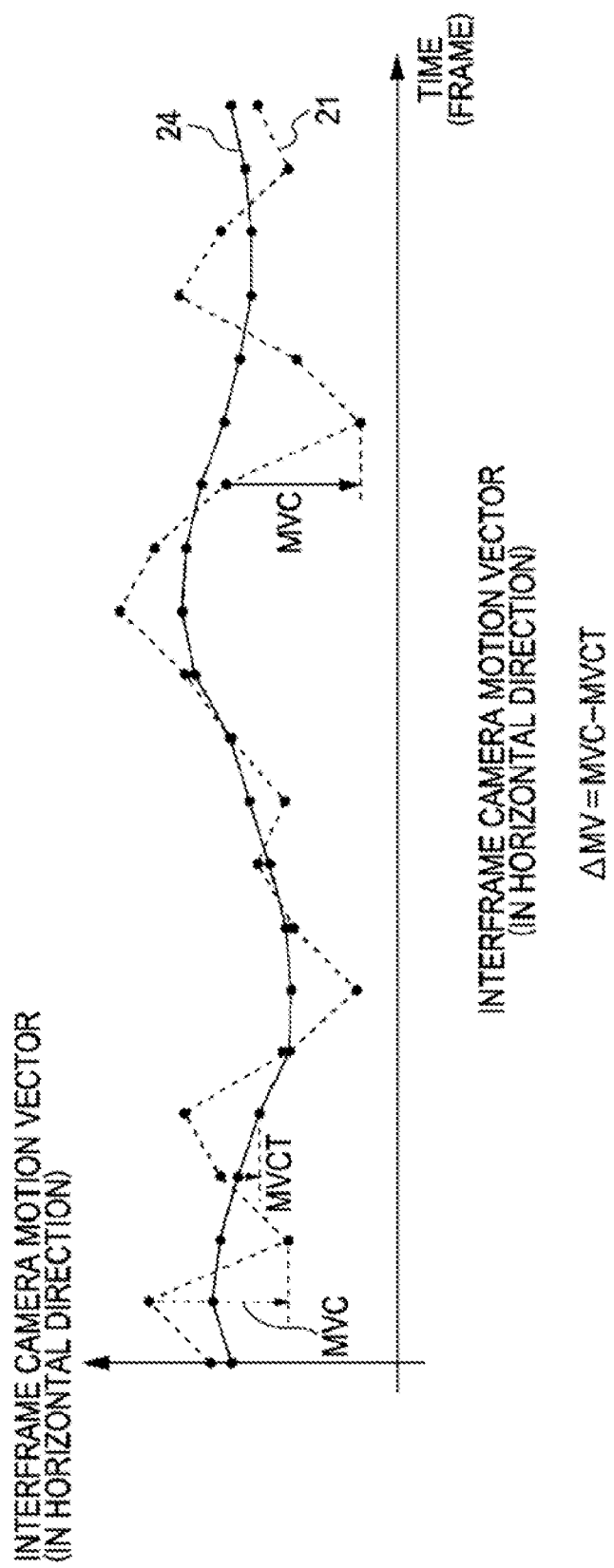
FIG. 4 is a graph illustrating motion vectors in a camera shake compensation process.

The CPU 4 the processes the detected motion vectors to detect the camera motion vector MVC indicating the motion of the camera represented on the input image 212 of the video signal SV, as shown in FIG. 4. Note that FIG. 4 shows only a horizontal component of the camera motion on the input image 21 and the output image 24. The camera motion vector MVC indicates the combination of motion of the television camera due to camera shake and motion due to a camera work, represented on the image of the video signal SV.

Figure 5:
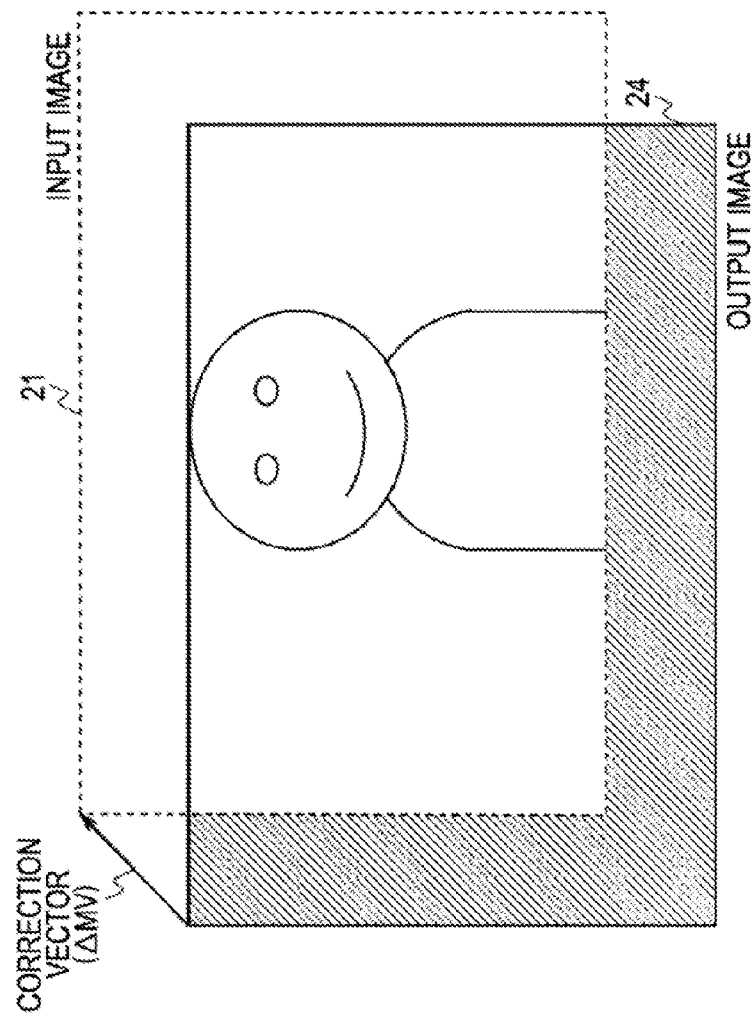
FIG. 5 is a diagram, showing a compensation process based on a compensation vector.

Next, in step SP4, the CPU 4 determines, from the detected camera motion vector MVC, a camera motion vector MVCT indicating only the motion due to the camera work including no camera-shake motion component. More specifically, the CPU 4 determines the camera motion vector MVCT by smoothing the successive camera motion vectors MVC by passing them through a low-pass filter. The CPU 4 stores the camera motion vector MVC including both the hand-shake motion component and the camera-work motion component and the camera motion vector MVCT including only the camera-work motion component, as camera motion information, in a memory. After the camera motion vectors MVC and MVCT have been detected for all frames of the video signal SV, the CPU 4 sequentially calculates camera shake compensation vectors ΔMV from the camera motion vectors MVC and MVCT. Thereafter, as shown in FIG. 5, the CPU 4 reads the video signal SV stored in the hard disk drive 3 and performs motion compensation in accordance with the compensation vectors AMY thereby producing an output image 24. The CPU 4 sets the luminance to a black level in an area (denoted by shading in FIG. 5) where the input image 21 is lost as a result of the motion compensation process to prevent a user from having a feeling of strangeness. Alternatively, the area where the input image 21 is lost as a result of the motion compensation process may be discarded, and the remaining image may be scaled to fit the size of the output image 24.

In step SP4, the CPU 4 produces a video signal compensated for in terms of camera motion due to hand shake. Next, in step SP5, the CPU 4 outputs the resultant video signal to an external device such as a monitor. In step SP 6, the process is ended.

Figure 2:
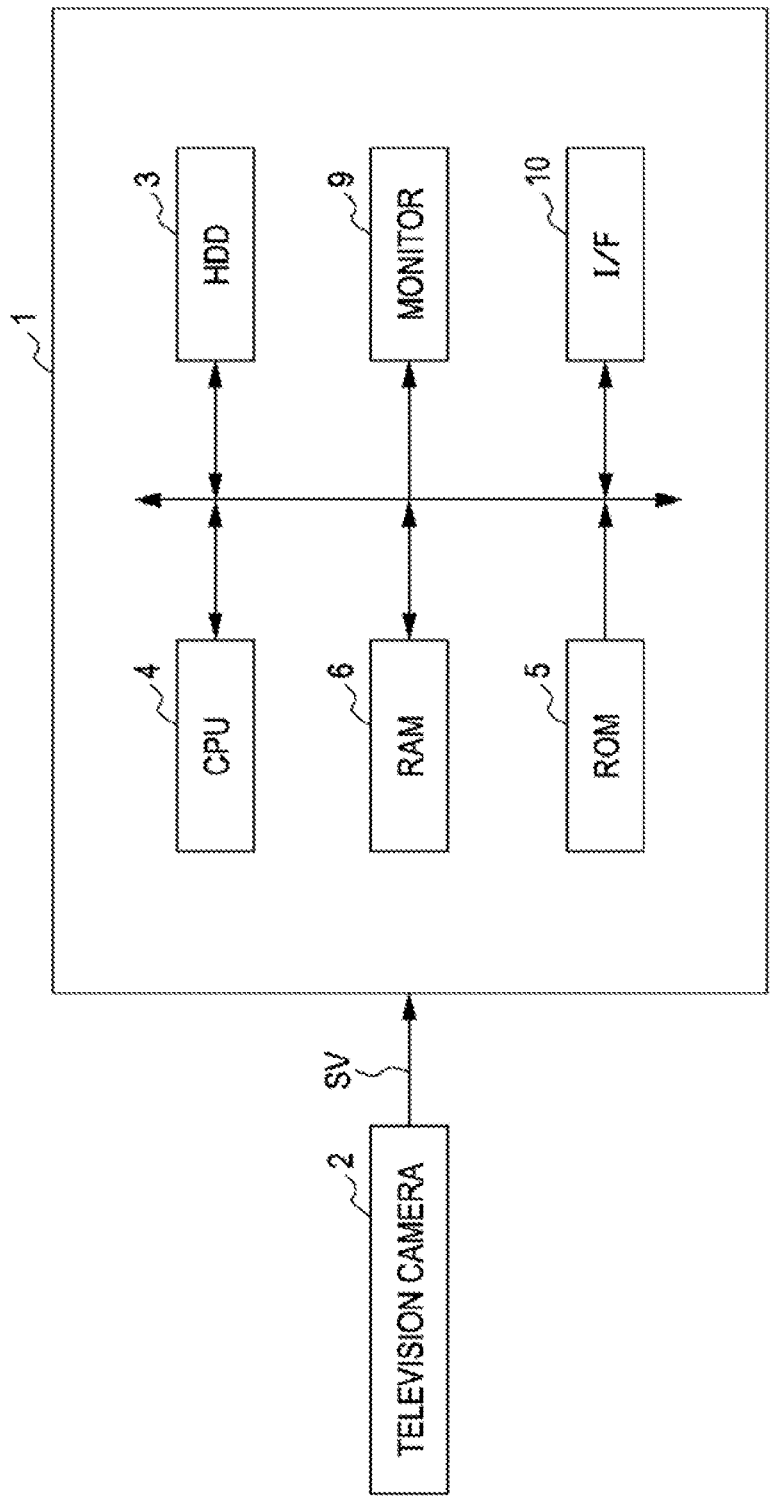
FIG. 2 is a block diagram showing a camera shake compensation apparatus according to an embodiment of the present invention.
Figure 6:
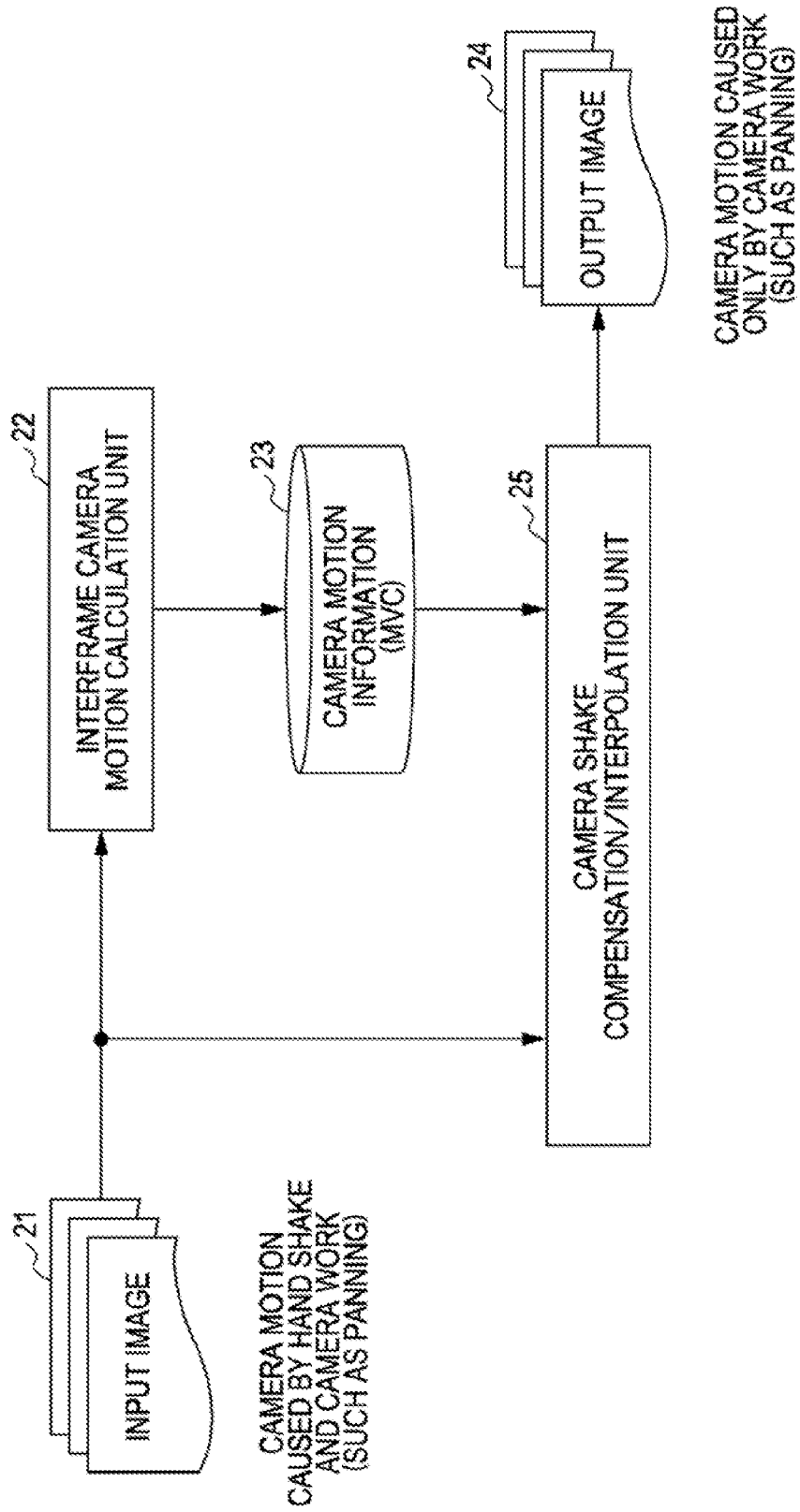
FIG. 6 is a functional block diagram showing an example of as compensation process.
Figure 7:
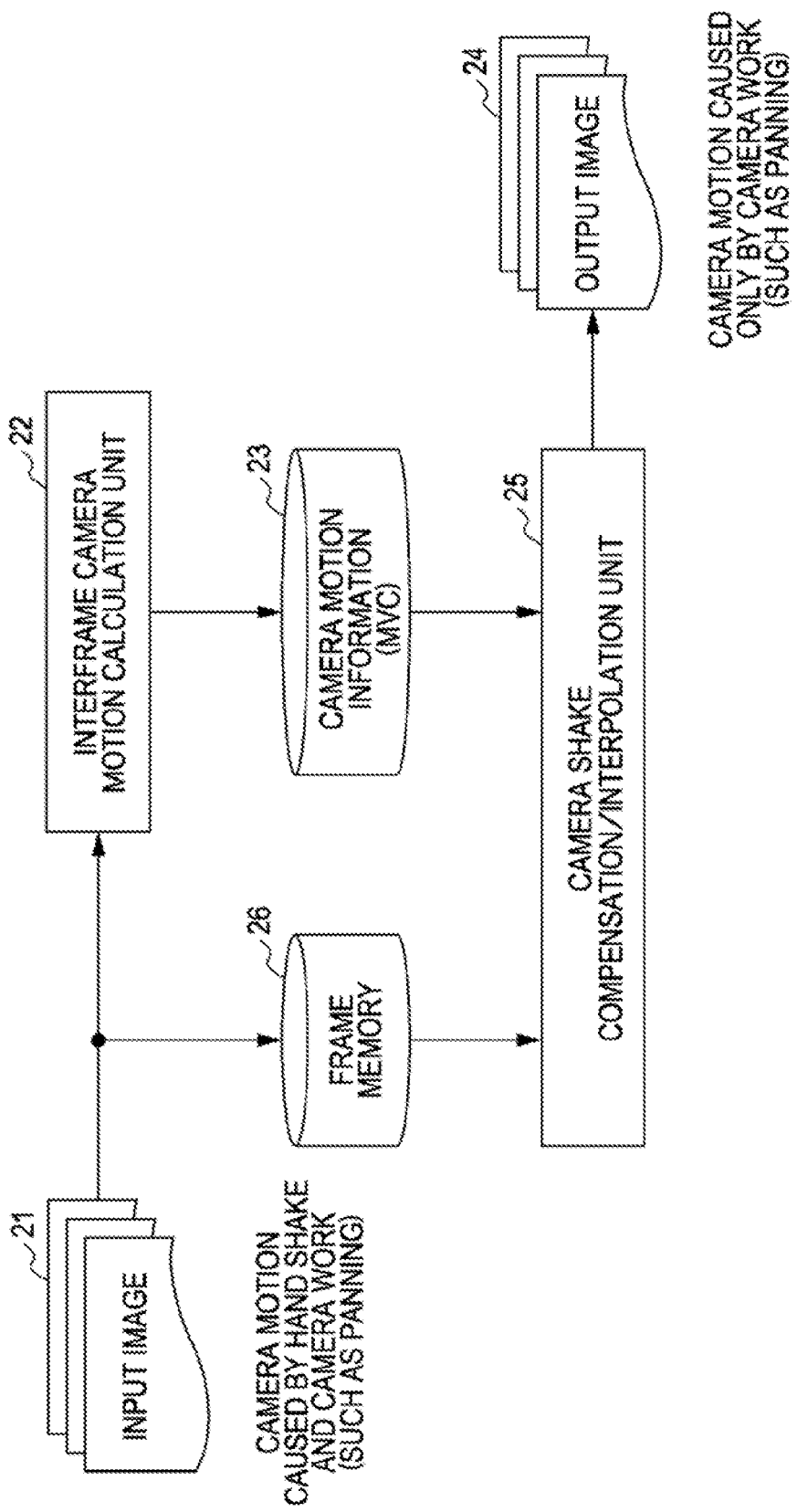
FIG. 7 is a functional block diagram showing another example of a compensation process.

By performing the process shown in FIG. 2, the CPU 4 implements functional blocks shown in FIG. 6. In the functional block diagram shown in FIG. 6, an interframe camera motion calculation unit 22 is a functional block corresponding to step SP3, and is adapted to detect a camera motion vector MVC including a hand-shake motion component and a camera-work motion component from the input image 21 of the video signal SV and store the detected camera motion vector MVC as camera motion information in the memory 23. A cameras shake compensation interpolation unit 25 is a functional block corresponding to step SP4, and is adapted to calculate the compensation vector ΔMV using the camera motion information MVC stored in the memory 23, and com- pensate for hand shake of the input image 21. Instead of first detecting camera motion vectors MVC from all frames of the input image 21 of the video signal SV and then compensating for hand shake of the input image 21 as in the case described above with reference to FIG. 6, compensation for hand shake may be made in units of a predetermined number of frames such that the input image 21 for which the camera motion vector MVC has been detected is stored in a frame memory 26, and the hand-shake compensation is performed on the input image 21 while detecting the camera motion vector MVC.

Figure 8:
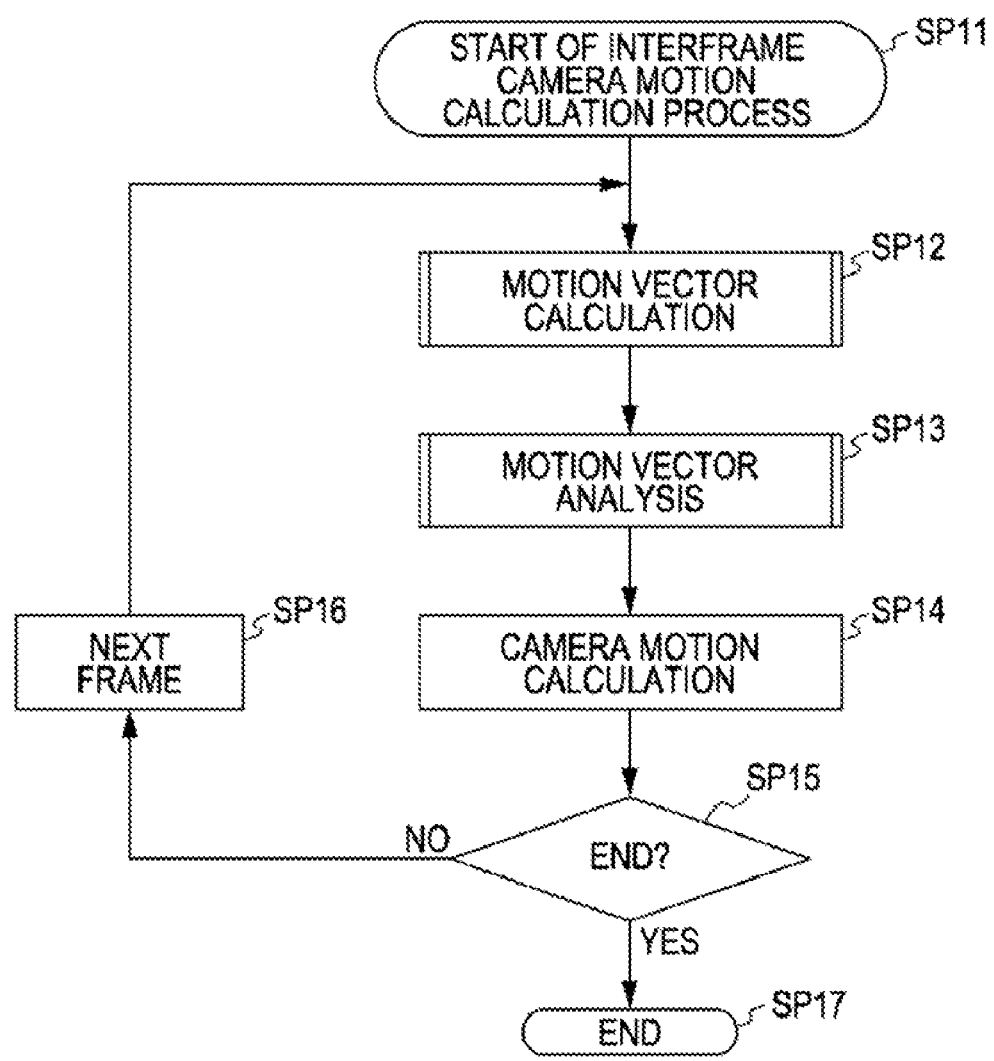
FIG. 8 is a flow chart showing an interframe camera motion calculation process.

FIG. 8 is a flow chart illustrating the details of the process in step SP3 shown in FIG. 3. If the CPU 4 starts the process in step SP11, then in step SP12, the CPU 4 performs the motion vector calculation process. In this motion vector calculation process, the CPU 4 acquires the input image 21 while performing the IP conversion, and detects motion vectors for various parts of the input image 21 by tracking feature points by a KLT method.

Next, in step SP13, the CPU 4 performs a motion vector analysis process to analyze the motion vectors detected in step SP12. More specifically, in this motion vector analysis process, the CPU 4 produces a two-dimensional histogram from motion vectors of one frame detected in step SP12.

From this histogram, the CPU 4 detects a group of motion vectors corresponding to a background. More specifically, the CPU 4 detects a group including a greater number of samples of motion vectors by detecting a frequency distribution peak from the histogram, and determines this group as a background group. Next, in step SP14, the CPU 4 performs a camera motion calculation process in which the average of the motion vectors of this background group is calculated thereby determining the camera motion vector MVC including both the hand-shake motion component and the camera-work motion component. Thus, in this embodiment, the background is detected on the assumption that the background has a greatest area in the input, image, and the camera motion vector MVC is detected from the motion of the background.

Next, in step SP15, the CPU 4 determines whether the process is completed for all frames. If the answer to step SP15 is no, the process proceeds to step SP16. In step SP15, the CPU 4 sets a next frame as a frame for which to detect, motion vectors. The process then returns to step SP12 to again perform the motion vector calculation process. On the other hand, in a case where the answer to step SP15 is yes, the process proceeds from step SP15 to step SP17 in which the process is ended.

Figure 9:
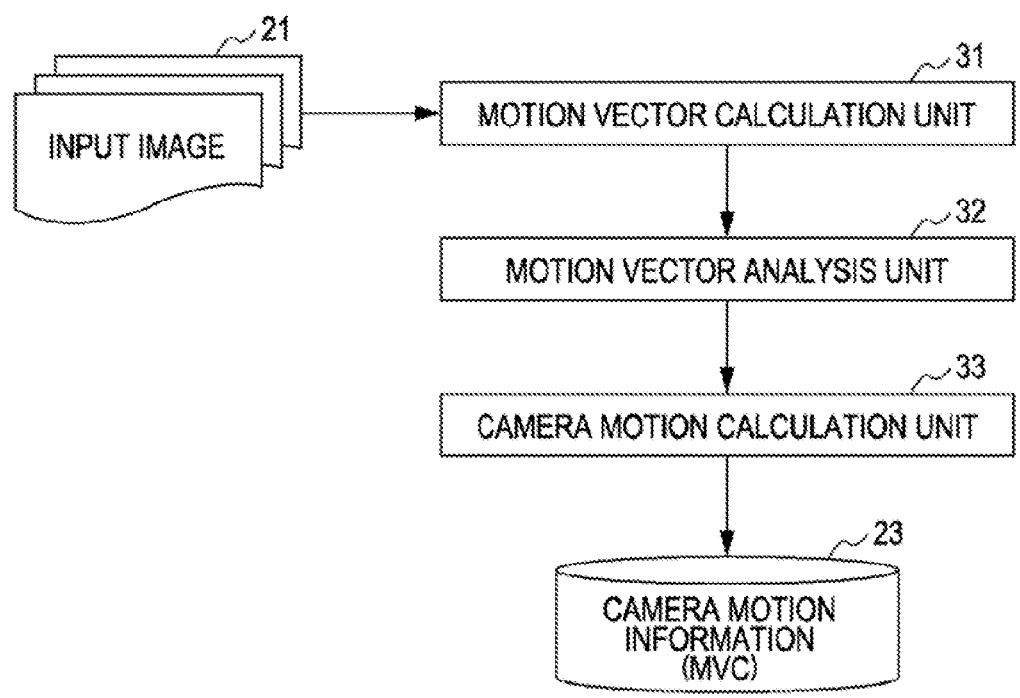
FIG. 9 is a functional block diagram corresponding to the process shown in FIG. 8.

By performing the process shown in FIG. 8, the CPU 4 implements functional blocks shown in FIG. 9. In the functional block diagram shown in FIG. 9, a motion vector calculation unit 31 is a functional block corresponding to step SP12, and is adapted to detect motion vectors for various parts of the input image 21. A motion vector analysis unit 32 is a functional block corresponding to step SP13, and is adapted to determine a histogram by analyzing motion vectors calculated by the motion, vector calculation unit 31 and detect a motion vector of a background. A camera motion calculation unit 33 is a functional block corresponding to step SP14, and is adapted to calculate the camera motion vector MVC including the hand-shake motion component and the camera-work motion component.

Motion Vector Calculation Process

FIG. 10 is a flow chart illustrating the details of the motion vector calculation process in step SP12 in FIG. 8. If the motion vector calculation process is started in step SP21, then in step SP22, the CPU 4 reads one frame of video signal SV from the hard disk drive 3 and sets it as a current frame.

Figure 12A:
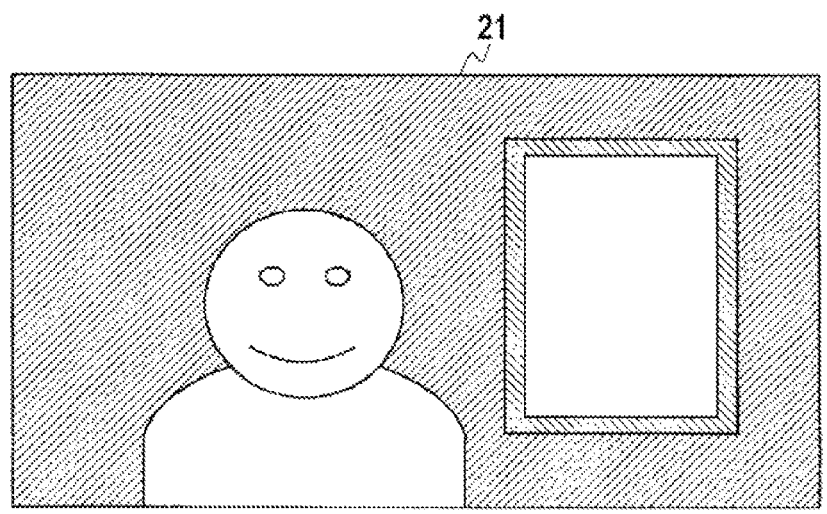
FIGS. 12A and 12B are diagrams illustrating the process shown in FIG. 10.
Figure 12B:
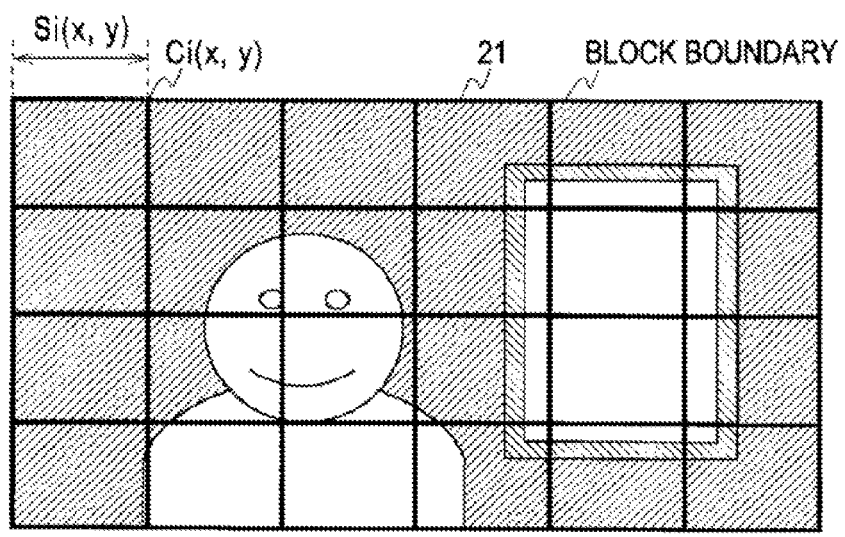

Next, in step SP23, the CPU 4 produces a block list. As shown in FIG. 12B (see also FIG. 12A for comparison), in the motion vector calculation process, the CPU 4 divides the input image in horizontal and vertical directions into a plurality of blocks, and detects motion vectors by tracking feature points set in respective blocks. More specifically, the CPU 4 sets Nfp feature points in each block and thus a total of Ntot feature points in one frame. For example, in a case where the input image 21 has a VGA (Video Graphics Array) size, the number, Nfp, of feature points of each block is set to 20, and the total number, Ntot, of feature points of one frame is set to 300. Thus, for the input image 21 with the VGA size, the CPU 4 divides the input image into 5 parts in the horizontal direction and 3 parts in the vertical thereby producing a total of 15 (=300/20) blocks. Note that in the example shown in FIG. 12E, the image is divided into 6 parts in the horizontal direction and 4 parts in the vertical direction.

In the block list, information associated with the blocks produced in the above-described manner is described. In the present embodiment, information indicating the position, the size, and the number of feature points of each block is described. More specifically, the position of each block may be represented, for example, by coordinates $Ci(x,y)$ of a point from which raster scanning is started in the block. The size of each block may be represented by the number of pixels $Si(x, y)$ in horizontal and vertical directions, where $(x, y)$ indicates horizontal and vertical positions of the block with reference to a block at a location at which raster scanning is started.

When a frame at the head of the video signal SV is processed, information indicating that no feature points are set in each block is described in the block list. For any frame other than that at the head of the video signal SV, the number of feature points of each block of the current frame is described in the block list.

For a frame other than the frame at the head of the video signal SV, the CPU 4 copies the block list of the previous frame and produces a block list for the current frame by updating the copied block list.

Next, in step SP24, the CPU 4 determines whether the current frame is an initial frame, that is, whether the current frame is at the head of the video signal SV.

If the answer to step SP24 is yes, the process proceeds from step SP24 to step SP25. In step SP25, the CPU 4 performs a feature point selection process. In the feature point selection process, additional feature points are set in blocks which need addition of feature points within the range in which the total number of feature points does not exceed the allowable maximum number Ntot of feature points per frame. This process is performed in the order of decreasing number of feature points to be added to blocks. For the initial frame, no feature points have been set in any block and the total number of feature points is 0. Thus, the CPU 4 sets Nfp feature points in each block. That is, for the initial frame, the feature point selection process is performed as an initial feature point setting process in which Nfp feature points are set in each block.

Figure 13:
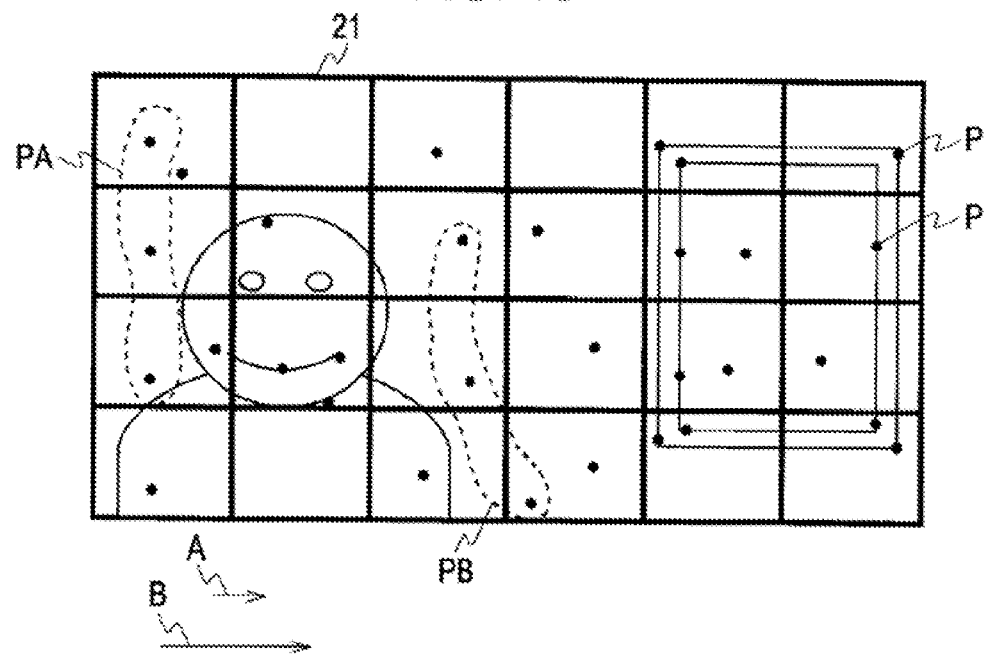
FIG. 13 is a diagram illustrating setting of feature points.
Figure 14:
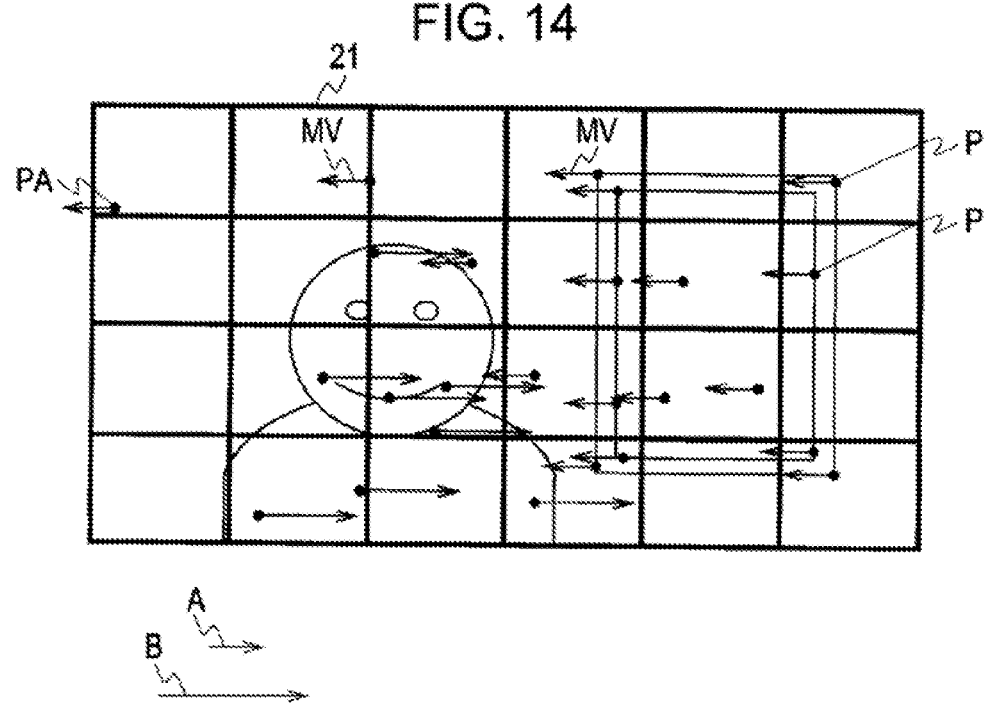
FIG. 14 is a diagram illustrating motion vector detection by tracking feature points.

On the other hand, when the current frame is a frame other than the initial frame, there are existing feature points, and, in step SP25, the CPU 4 By adding feature points to blocks which, need addition of feature points within the range in which the total number of feature points does not exceed the allowable maximum number Ntot of feature points per frame, evenness of the distribution of feature points among blocks is corrected. For example, if, as shown in FIG. 13, the camera is panned as represented by an arrow B so as to track a person moving from left to right in the screen as represented by an arrow A, then, as shown in FIG. 14, the panning of the camera causes feature points PA located at the left-hand end of the screen to become undetectable in the current frame. On the other hand, a background image hidden behind the person in the previous frame appears in an area of the left-hand end. Thus, in blocks on the left-hand end of the screen, it becomes impossible to track feature points in a following frame. As a result, when the following frame is selected as the current frame and is processed, a reduction in the number of feature points occurs.

On the other hand, the motion of the person causes feature points PB in a central area of the screen to be hidden behind the person. These feature points also become undetectable in the current frame. In this case, feature points of the previous frame move into blocks which are hidden behind the person as a result of the movement of the person, and feature points of the background move into blocks hidden by the person as a result of the panning of the camera. As a result, the number of feature points in these blocks increases compared with the previous frame. On the other hand, in blocks on the right-hand end of the screen, a background located outside the screen in the previous frame comes into the inside of the screen in the current frame. As a result, a reduction in the number of feature points occurs. Thus, evenness occurs in a spatial distribution of feature points, and evenness occurs in detection of motion vectors.

Figure 15:
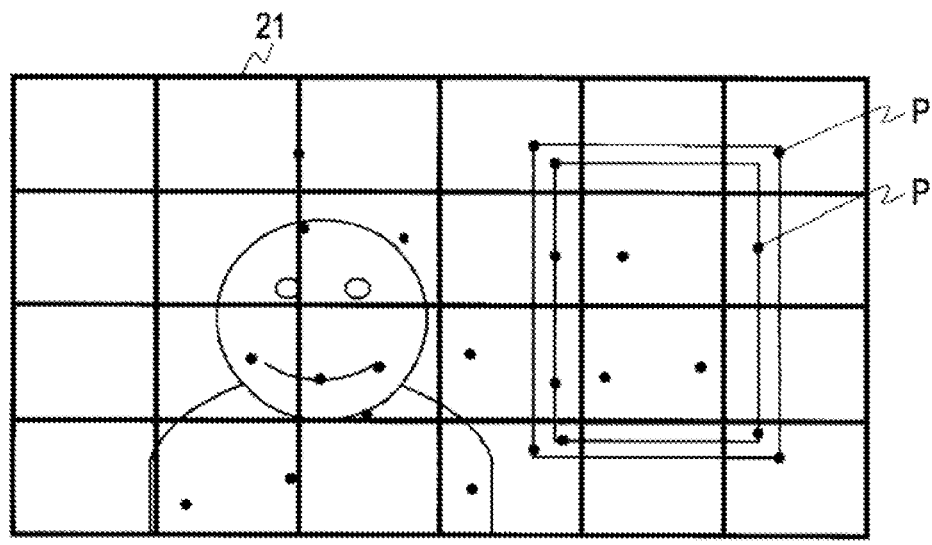
FIG. 15 is a diagram illustrating an increase/reduction in the number of feature points.
Figure 16:
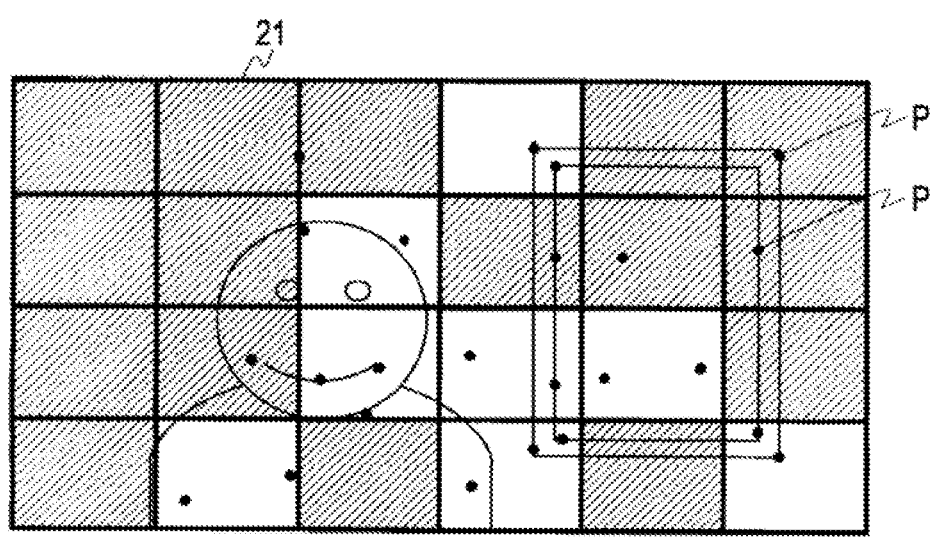
FIG. 16 is a diagram illustrating addition of feature points.

To avoid the above problem, the CPU 4 deletes feature points which have become difficult to track and feature points which have come too close to adjacent feature points via the tracking of feature points using the KLT method. If the total number of feature points becomes smaller than the specified number, Ntot, of feature points per frame as a result of the deletion of feature points, feature points are added to correct the evenness in the distribution of feature points. More specifically, as shown in FIG. 15 (see also FIG. 15 for comparison), when the number, Nfp, of feature points of each block is specified as 2, if there is a block including one or no feature point, then the CPU 4 adds a feature point as shown in FIG. 16 so that each block includes two feature points thereby correct the uneven distribution of feature points. In the example shown in FIG. 16, blocks to which to add feature points are denoted by shading. Mote that if distance between a feature point and an adjacent feature point becomes too small as a result of tracking according to the KLT method, deleting of feature points is performed previously in the feature point tracking and motion vector calculation process in step SP28. In deleting of feature points, if there are two or more feature points which are too close to their adjacent feature point in the current frame, deleting is performed in the order of increasing feature-point likelihood value. The feature-point likelihood value will be described later when the feature point extraction process is discussed.

As described above, in the process of dividing the frame of the image of interest into blocks, setting feature points in each block, and detecting motion vectors, if unevenness occurs in the distribution of feature points, then the CPU 4 adjusts the number of feature points in the feature point selection process in step SP26. If step SP25 is completed, the process proceeds to step SP26 in which the CPU 4 sets the current frame as the previous frame. Thereafter, the process is ended in step SP27.

When the current frame is not the initial frame, the decision made in step SP24 is negative, and thus the CPU 4 controls the processing flow to jump from step SP24 to step SP28.

In step SP28, the CPU 4 tracks the feature points set in respective blocks of the previous frame to detect corresponding feature points in the current frame. Furthermore, as shown in FIG. 14, the CPU 4 determines motion vectors MV of respective feature points by calculating the differences between the feature points in the current frame and the corresponding feature points in the previous frame. The calculated motion vectors MV are stored in the memory 23. In the tracking of feature points, if some feature point comes too close to another feature point, a feature point with lower feature-point likelihood value is deleted. Instead of the feature-point likelihood value, a confidence level may be used as a criterion for determining which feature point should be deleted. Alternatively, deleting may be performed randomly. If some feature point becomes difficult to track, such a feature point is also deleted.

Next, in step SP25, the CPU 4 corrects the unevenness in the distribution of feature points in each block. The CPU 4 then performs step SP26. After step SP26, the process is ended in step SP27.

By performing the process shown in FIG. 10, the CPU 4 implements functional blocks shown in FIG. 11. In the functional block diagram shown in FIG. 11, a frame reading module 41 is a functional block corresponding to step SP22 in FIG. 10, and is adapted to set a newly acquired frame as the current frame to be processed. A block-dividing module 42 is a functional block corresponding to step SP23, and is adapted to divide the image of the current frame into a plurality of blocks and produce the block list. A feature point integrally-processing module 44 is a functional block corresponding to steps SP25 and SP23. A feature point extraction unit 43 is a functional block adapted to select feature points in accordance with likelihood of feature points. An iteration preparation module 45 is a functional block corresponding to step SP26. Feature point information 23 indicates coordinates and motion vectors of respective feature points in the current frame.

Figure 17:
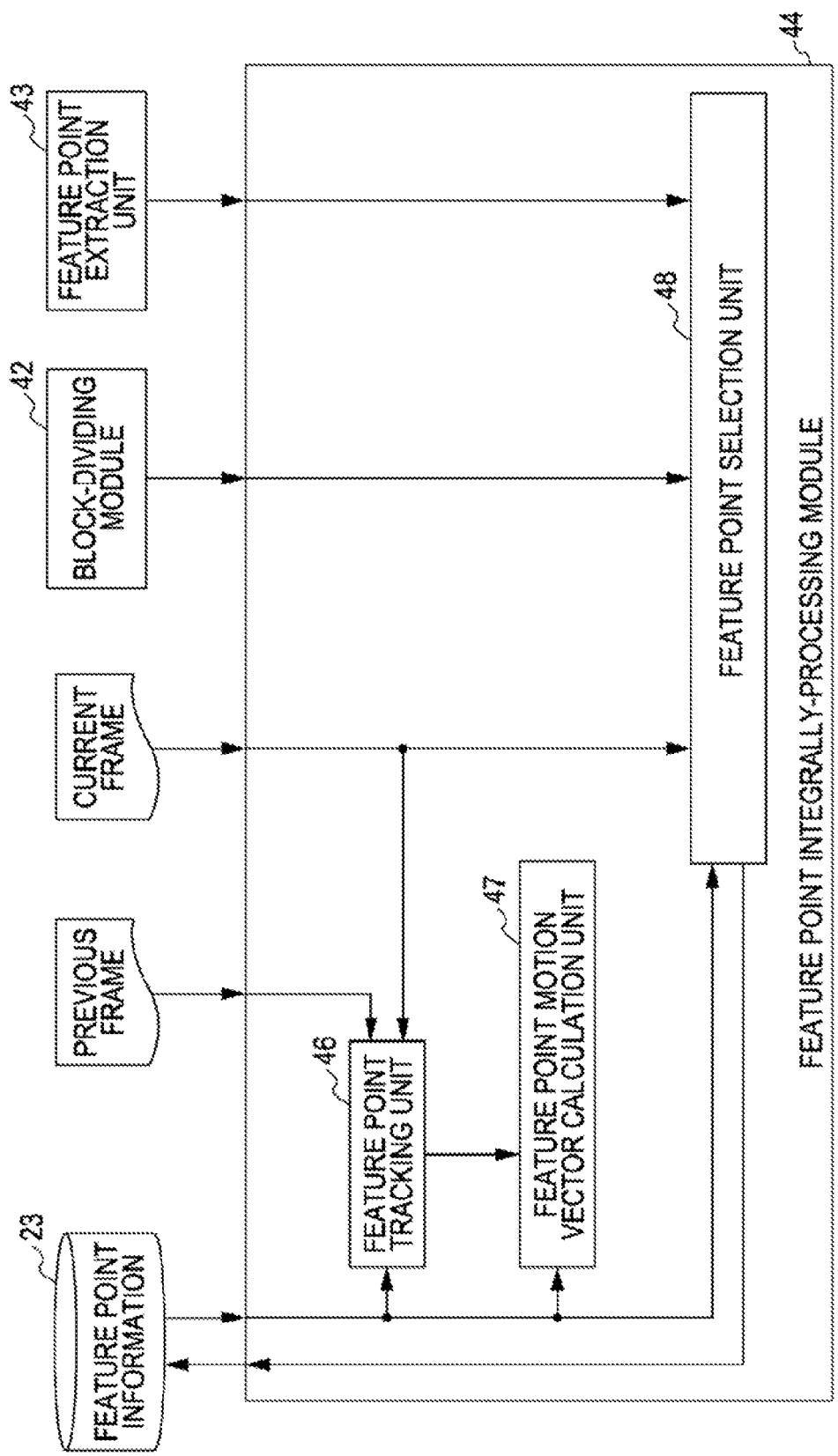
FIG. 17 is a functional block diagram corresponding to the process shown in FIG. 10.

The feature point integrally-processing module 44 includes, as shown in FIG. 17, a functional block implementing a feature point tracking unit 46 adapted to perform a feature point tracking process and a functional block implementing a feature point motion vector calculation unit 47 adapted to perform a motion vector calculation process in step SP 28, and also includes a functional block implementing a feature point selection unit 4S in step SP25. In the present embodiment, the process performed by the feature point integrally-processing module 44 is based on the KLT method.

The details of the feature point selection process in step SP 25 in FIG. 10 are described below referring to flow charts shown in FIGS. 18 and 19. If the feature point selection process is started in step SP31, then in step SP32, the CPU 4 determines whether the total number of feature points of the current frame is smaller than Ntot. In a case where the number of feature points is reduced via the process of feature point tracking and the motion vector calculation, the CPU 4 makes an affirmative determination in this step SP32.

In a case where the CPU 4 makes a negative determination in step SP32, the CPU 4 controls the processing flow to proceed from step SP32 to step SP33 to end the feature point selection process.

In the case where the CPU 4 makes the affirmative determination in step SP32, the CPU 4 controls the processing flow to proceed from step SP32 to step SP34. In step SP34, the CPU 4 produces a work list for use in the feature point selection process, by copying necessary items of the block list. More specifically, the work list is produced so as to include information identifying respective blocks, information indicating the number of feature points of each block, and information indicating the total number of feature points. The CPU 4 produces the work list in accordance with the coordinates of feature points stored in the memory 23.

If the work list is produced by CPU 4, the process proceeds to step SP35. In step SP35, blocks including feature point the number of which is greater than the initial value Nfp are deleted from the work list so that those blocks will not be processed. For example, when the initial number, Nfp, of feature points per block is set to 6, if numbers of feature points of respective blocks b1 to b9 are 10, 0, 8, 1, 5, 4, 3, 5, and 1 as shown in FIG. 20A, then blocks b1 and b3 are deleted from the work list as shown in FIG. 20B. In this example, it is assumed that the total number Ntot of feature points is set to 60. Thus, in this situation, the total number of feature points is less than the specified number Ntot by 23. In the case of the initial frame, each block has no feature points, and thus the total number of feature points is less than the specified number Ntot by 60.

Next, in step SP36, the CPU 4 groups blocks recorded in the work list in accordance wish the number of feature points, and sorts groups in order of increasing number of feature points. That is, the CPU 4 sets the order of processing groups by re-arranging the groups in the order of increasing number of feature points. In the example shown in FIG. 20B, blocks are grouped, as shown in FIG. 20C, into a first group G1 including a block b2 with no feature points, a second group G2 including blocks b4 and h9 each including one feature point, a third group G3 including a block b7 including three feature points, a fourth group G4 including a block b6 including four feature points, and a fifth group G5 including blocks b5 and b8 each including five feature points.

Next, in step SP37, the CPU 4 randomizes the arrangement of blocks in each group. Next, in step SP38, the CPU 4 determines whether the current total number of feature points is smaller than Ntot. If the answer to step SP38 is no, the CPU 4 controls the processing flow to proceed from step SP38 to step SP33 to end the feature point selection process.

On the other hand, if the answer to step SP38 is yes, the process proceeds from step SP38 to step SP39.

In step SP33, the CPU 4 selects a block at the head of the work list as a block to be subjected to setting of feature points. Next, in step SP40, one feature point is set in this block. The setting is performed by extracting one feature point in the feature point extraction process.

Next, in step SP41, the CPU 4 determines whether the number of feature points of the current block has become equal to the initially specified number Nfp. If the number of feature points obtained after the addition of one feature point described above is still smaller than the initially specified number Nfp, the CPU 4 makes a negative determination in step SP41, and thus the process proceeds from step SP41 to step SP42.

In step SP42, the CPU 4 updates the number of feature points in response to the addition of the feature point and updates the grouping in the work list. More specifically, in accordance with the result of the addition of the feature point, the work list updates such that the current block is moved into a next group of blocks including a greater number of feature points. In this process of updating the work list in which groups are arranged in the order of increasing number of feature points, the CPU 4 places the current block at the end of the next block in the work list More specifically, in the example shown in FIG. 20C, a feature point is added to the block b2 having no feature points and the block b2 is moved from the first group G1 to the second group G2 of blocks each including one feature point and is put at the end in this group, as shown in FIG. 20I).

After one feature point is added to one block in the above-described manner, the CPU 4 returns the process to step SP38. On the other hand, in a case where the answer to step SP41 is affirmative, the process proceeds to step SP43. In step SP43, the current block is deleted from the work list. The CPU 4 then returns the processing flow to step SP38 to perform the above-described process repeatedly until the total number of feature points reaches the specified number Ntot. That is, the CPU 4 repeats the process in which blocks are randomly selected one by one from a group of blocks which need addition of feature points, and a feature point is added to the selected block.

In the example shown in FIG. 20D, a feature point is added to a block b4 at the head in the second group G2, and the resultant block b4 is moved at the end in the next group, i.e., the third group G4. That is, as a result, the block b4 is placed at a location following the block b7 in the group G4.

In a case where no feature point is extracted in the feature point extraction process in step SP40, the process proceeds from step SP41 to step SP43. In step SP43, the CPU 4 deletes the current block from the work list. The process then returns to step SP38.

Figure 18:
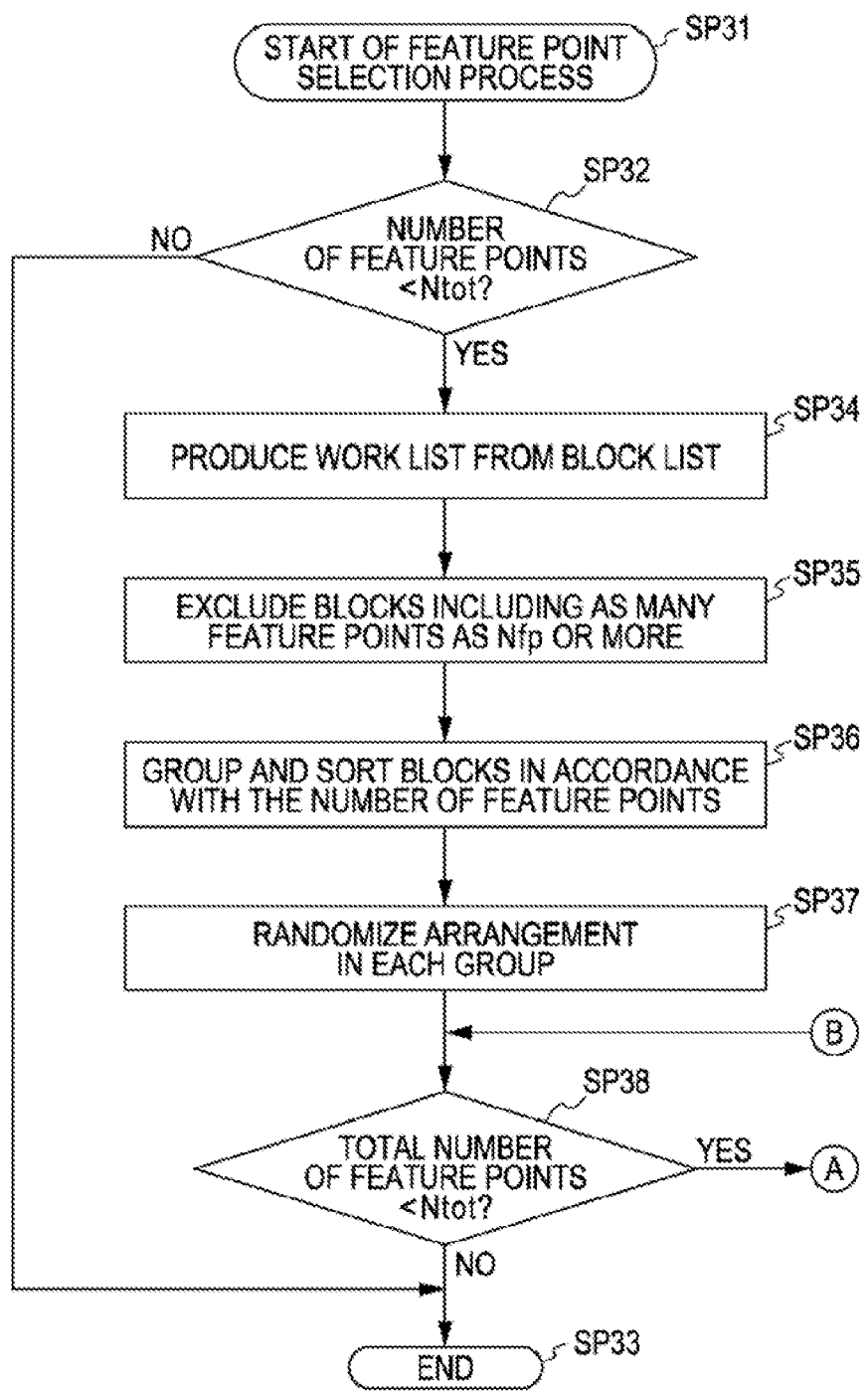
FIG. 18 is a flow chart illustrating the details of a feature point selection process.
Figure 19:
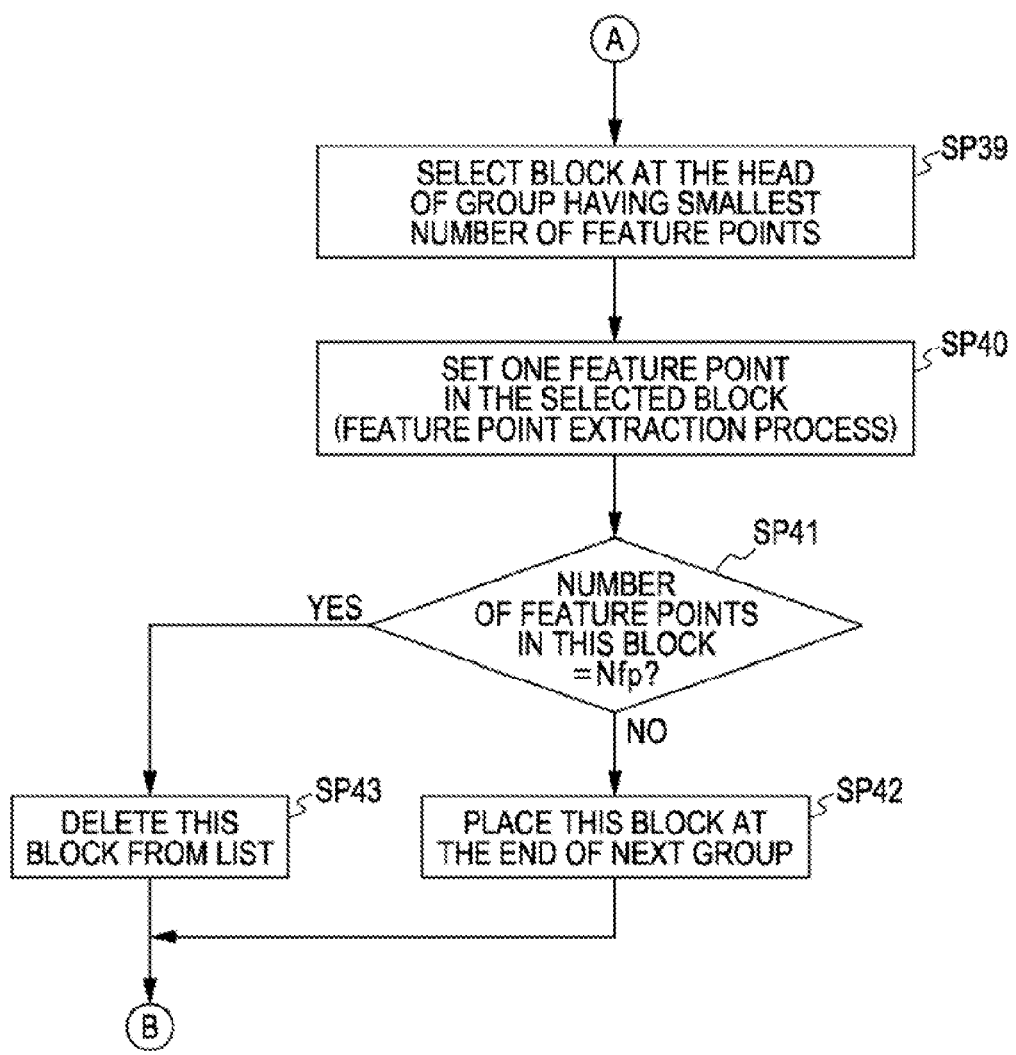
FIG. 19 is a flow chart illustrating steps following the process shown in FIG. 18.
Figure 21:
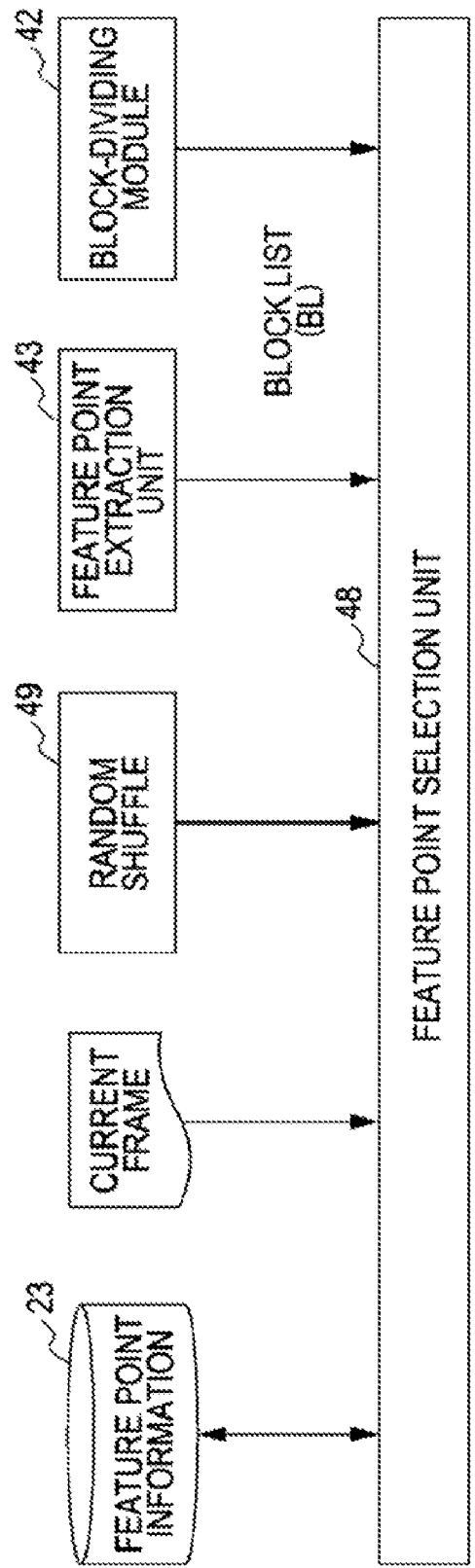
FIG. 21 is a functional block diagram corresponding to the process shown in FIGS. 18 and 19.

By performing the process shown in FIGS. 18 and 19, the CPU 4 implements functional blocks shown in FIG. 21. In the functional block diagram shown in FIG. 21, a random shuffle unit 49 is a functional block adapted to randomize the arrangement in each group in the work list.

Figure 22:
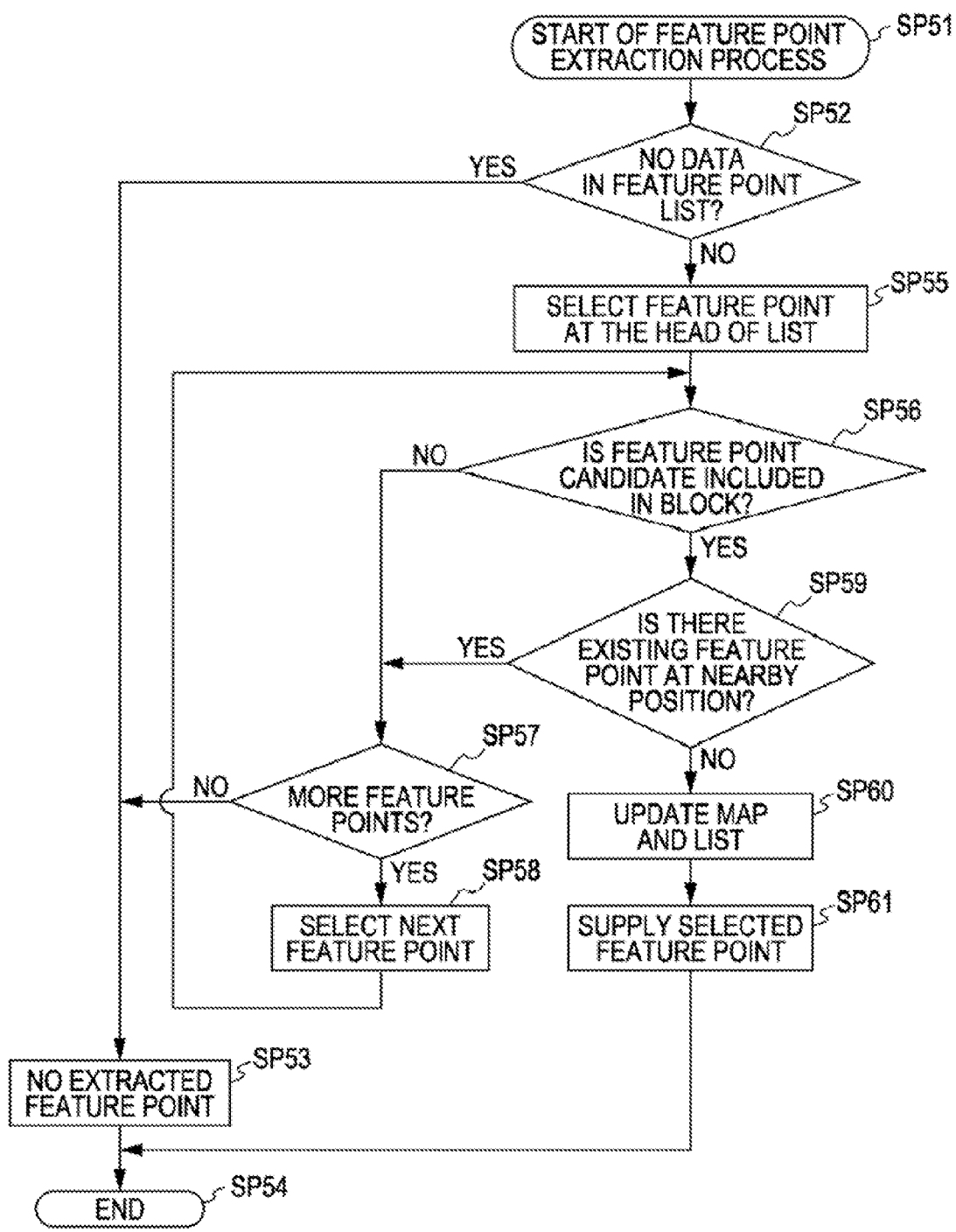
FIG. 22 is a flow chart illustrating the details of a feature point extraction process.

FIG. 22 is a flow chart showing the details of the feature point extraction process. For preparation of the feature point extraction process, the CPU 4 produces a feature point list and a feature point map on a frame-by-frame basis. The feature point list is a list of candidates for feature points. More specifically, likelihood and coordinates of each feature point candidate are described in the feature point list. Herein, the likelihood is a variable indicating the likelihood of being a feature point (hereafter, referred to as feature-point likelihood value). The CPU 4 determines the feature-point likelihood value of each pixel of the input image by using the KLT method, and extracts candidates for feature points by detecting coordinates of pixels having a feature-point likelihood value equal to or greater than a predetermined threshold value. The CPU 4 then sorts the coordinates in the order of decreasing feature-point likelihood value and describes the result in the feature point list.

More specifically, the CPU 4 selects a smaller eigenvalue from eigenvalues α1 and α2 obtained in calculation of equation (1) described below and employs the selected eigenvalue as the feature-point likelihood value.

$$G = \begin{bmatrix} \Sigma Ix \times Ix & \Sigma Ix \times Iy \\ \Sigma Ix \times Iy & \Sigma Iy \times Iy \end{bmatrix} \quad (1)$$

In equation (1), Ix is the differential of pixel values in the horizontal direction, and Iy is the differential of pixel values in the vertical direction. Equation (i) is calculated over predetermined horizontal and vertical ranges around a pixel of interest. The range is set, for example, to au area of 7×7 pixels. From equation (1), the CPU 4 calculates a variation in the gradient of pixel values in the vicinity of a feature point and employs the calculated value, which indicates how greatly pixel value changes, as the feature-point likelihood value. In other words, in an area where there is no great change in pixel value, no feature-point likelihood value is described in the feature point list. Note that, (x, y) in equation (1) represents coordinates of a pixel.

The feature-point likelihood map is a map in which the feature-point likelihood values are placed at positions corresponding to the positions of the pixels of the input image. For pixels which have a feature-point likelihood value smaller than a predetermined value and which are not registered in the feature point list, the feature-point likelihood value is rounded to 0 in the feature-point likelihood map. The feature point list is used to preferentially select pixels which are suitable as feature points. The feature-point likelihood map is used to determine conditions of nearby pixels when a candidate selected from the feature point list is employed as a feature point.

In step SP51, the CPU 4 starts the feature point extraction process in response to a request issued in the feature point selection process (step SP 40 in FIG. 19). In step SP52, the CPU 4 determines whether the feature point list includes no data. If the answer to step SP52 is yes, the CPU 4 controls the processing flow to proceed from step SP52 to step SP53. In step SP53, the CPU 4 notifies the feature point selection process that no feature points have been extracted. The processing flow then proceeds to step SP54 to end the feature point extraction process.

In the case where there are more feature point candidates in the feature point list, the CPU 4 makes a negative determination in step SP52, and thus the process proceeds to step SP55. In step SP55, the CPU 4 selects a feature point candidate at the head of the feature point list. Next, in step SP56, the CPU 4 examines the block list to determine whether the selected feature point candidate is included in the block of interest being subjected to setting of feature points. If the answer to step SP56 is no, the CPU 4 controls the processing flow to proceed from step SP56 to step SP57, In step SP57, the CPU 4 determines whether there are more feature point candidates in the feature point list. If the answer to step SP57 is no, the process jumps to step SP53. In step SP53, the CPU 4 notifies the feature point selection process that no feature points have been extracted. The processing flow then proceeds to step SP54 to end the feature point extraction process.

If there is still a feature point candidate remaining in the feature point list, the CPU 4 makes an affirmative determination in step SP57 and controls the processing flow to proceed from step SP57 to step SP58. In step SP58, the CPU 4 selects a next candidate from the feature point list. The process then returns to step SP56. As described above, the CPU 4 sequentially scans the feature point list in the order of decreasing feature-point likelihood value and detects candidates for feature points belonging to the block of interest being subjected to setting of feature points.

If a feature point candidates is detected, the CPU 4 makes an affirmative determination in step SP56 and controls the processing flow to proceed to step SP59 from step SP56. In step SP59, the CPU 4 determines whether another feature point has already been set in the current frame, as a result of a success in the feature point tracking and the motion vector calculation, in an area within a predetermined range Δfp from the detected feature point candidate. When the answer to step SP59 is yes, if the detected feature point candidate is employed as a feature point, then the feature point is set at a location close to the existing feature point. To avoid the above problem, when the answer to step SP59 is yes, the CPU 4 controls the processing flow to proceed to step SP57 to determine whether there are more feature point candidates in the feature point list.

On the other hand, if there is no already existing feature point close to the feature point candidate of interest, the CPU 4 makes a negative determination in step SP59 and controls the processing flow to proceed, to step SP60. In step SP60, the CPU 4 updates the feature point list and the feature-point likelihood map to correctly reflect the selection of this feature point candidate. More specifically, the CPU 4 sets the feature-point likelihood value to foe invalid for feature points located within the range of Δfp around the feature point of interest in the feature-point likelihood map. The setting of the feature-point likelihood value to be invalid is performed by setting the value of the feature-point likelihood value to have a negative value. In response to this setting, candidates for feature points located in the above-described range are removed from the feature point list. As a result of the above process performed by the CPU 4, further selection of feature points is disabled in the range of Δfp around the selected feature point candidate.

Next, in step SP61, the CPU 4 returns the feature point candidate to the feature point selection process. The processing flow then proceeds to step SP54 to end the feature point extraction process. In step SP40 in FIG. 19, the CPU 4 sets this feature point candidate returned in step SP61 in FIG. 22 as a feature point.

By performing the process shown in FIG. 22, the CPU 4 implements, as shown in FIG. 23, the feature point extraction unit 43 adapted to detect a feature point using the feature point list 52 and the feature-point likelihood map 53.

In the above-described process, to determine in step SP59 whether there is an already existing feature point at a close location, it is necessary to search for existing feature points each time the process shown in FIG. 22 is performed. However, performing the process shown in FIG. 22 repeatedly causes a great processing load to be imposed on the CPU 4. To avoid the above problem, information associated with already existing feature points may be reflected in the feature-point likelihood map and the feature point list thereby reducing the processing load. More specifically, a process similar to the process of updating of the feature point list and the feature-point likelihood map in step SP60 may be performed on the already existing feature points. This results in an increase in processing speed.

Motion Vector Analysis Process

FIG. 24 shows, in the form of a table, feature point information detected in the motion vector calculation process and supplied to the motion vector analysis process. The feature point information includes attribute information associated with each feature point. The attribute information may include coordinates P(x, y) of a feature point, the feature-point likelihood value, the valid/invalid flag, the motion vector, and class information.

The coordinates P(x, y) of a feature point indicate the location of the feature point. When a feature point is set for the first time, initial values of the coordinates P(x, y) are set, and the values are updated each time the motion vector calculation process succeeds in tracking of the feature point. Note that the coordinates P(x, y) are assigned in units with accuracy equal to or smaller than that of pixel values. As for the feature-point likelihood value, a value defined when the feature point is set initially is maintained. The valid/invalid flag is a flag indicating whether the coordinates P(x, y) of the feature point is valid or invalid. When the feature point is initially set, the valid/invalid flag is set to be valid. The motion vector is a motion vector of the feature point of interest. The motion vector is updated each time the process succeeds in tracking a feature point. In the motion vector calculation process, if the process fails to track a feature point because the feature point has been hidden or for some reason, the valid/invalid flag is set to be invalid, and other attributes such as coordinates P(x, y) are set to zero. If a feature point is added, a feature point whose valid/invalid flag is in the invalid state is detected, and information associated with the additionally registered feature point is set in the information associated with the detected feature point. If no feature point whose valid/invalid flag is in the invalid state is detected, information is added for the new feature point.

The class information indicates a class of the feature point of interest defined via the motion vector analysis process. Feature point classes include a "background feature point" which is a feature point detected in a background, a "non-background feature point" which is a feature point detected in a subject other than the background, and an "unclassified feature point" which has not yet been classified as either a "background feature point" nor the "non-background feature point". When a feature point is initially set, the feature point is set to the "unclassified feature point".

Figure 25:
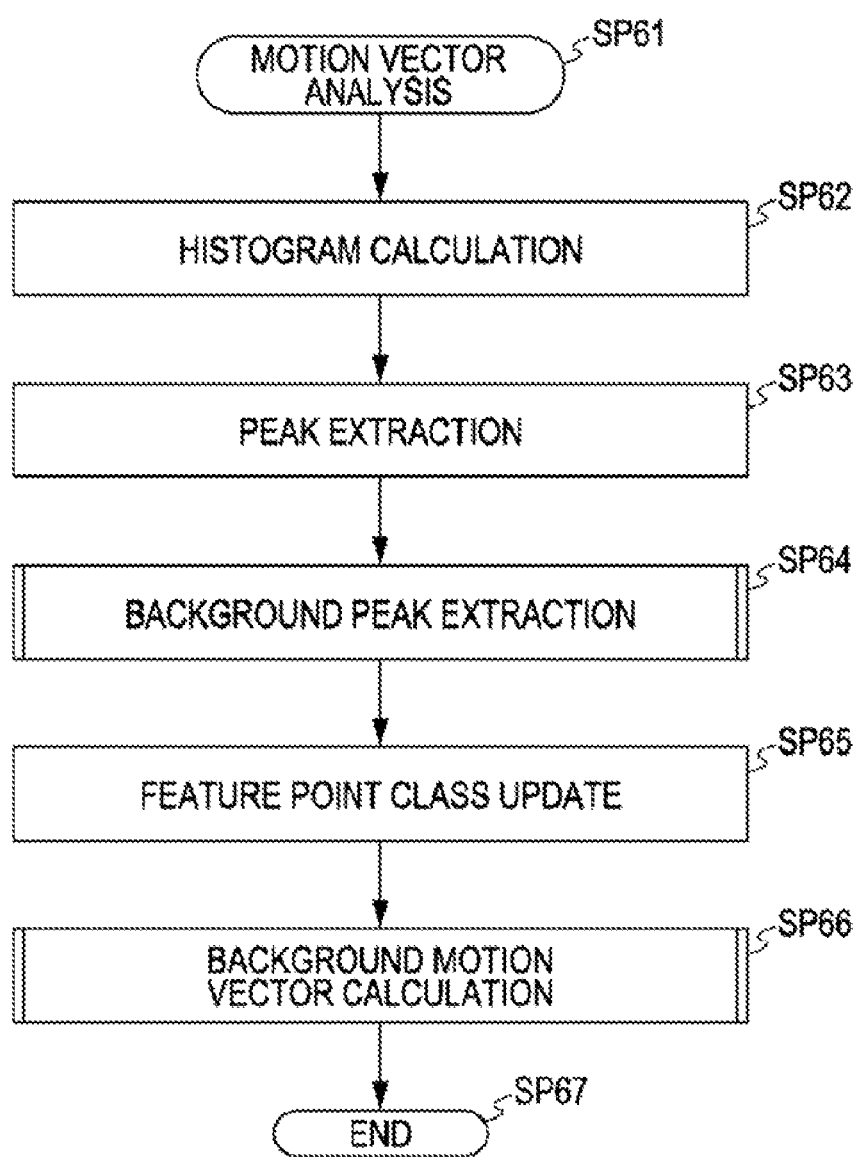
FIG. 25 is a flow chart illustrating the details of a motion vector analysis process.

FIG. 25 is a flow chart illustrating the details of the motion vector analysis process using the feature point information. The process shown in FIG. 25 is performed using only feature point information associated with feature points whose valid/invalid flag is set to be valid except for the feature point class updating process in step SP65. If the CPU 4 starts the motion vector analysis process in step SP61, then in step SP62, the CPU 4 produces a two-dimensional histogram indicating a distribution of motion vectors in accordance with the feature point information supplied from the motion vector calculation process. The histogram is produced such that the horizontal and vertical components of motion vectors are represented by x and y coordinates, and the frequency counts are represented by the y coordinate. In the production of the histogram, the CPU 4 divides the horizontal and vertical components of the motion vectors by the resolution rez of the histogram, rounds the resultant quotients to floating-point values, and quantizes the results.

In the histogram, the frequency count of motion vectors may be weighted in accordance with the confidence level of the class information. The confidence level may be given by the number of times that the process has successively succeeded in tracking a feature point of interest. Alternatively, the confidence level may be given by the degree of change in distance to a nearby feature point. More specifically, the weighting factor is increased with increasing number of times that the process has successively succeeded in tracking of a feature point as a background feature point or with decreasing change in distance to an adjacent feature point, whereby the histogram is produced such that the more likely a mountain-like distribution segment corresponds to a background, the higher the mountain-like distribution segment, thereby increasing the defection accuracy of the background. The method used herein in the weighting may be applied to weighting of the peak likelihood which will be described later, Note that if weighting is performed on the histogram, the number of feature points is represented by a weighted value in the following process.

Figure 26A:
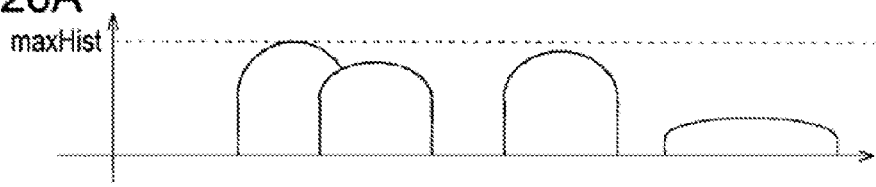
FIGS. 26A to 26E are histograms used in a peak extraction process in a motion vector analysis process.
Figure 26B:
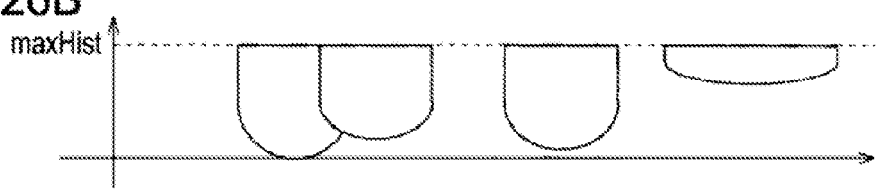

Next, in step SP63, the CPU 4 partitions mountain-like distribution segments in the histogram produced in step SP62 by using the image region segmentation method. In the present embodiment, segmentation is performed using the watershed method. More specifically, the CPU 4 detects a maximum count value maxHist from the histogram produced in the histogram calculation process (step SP62) as shown in FIG. 26A. Next, as shown in FIG. 26B, the histogram is inverted to produce an inverted histogram in which the count value falls down from the detected maximum count value maxHist.

Figure 26C:
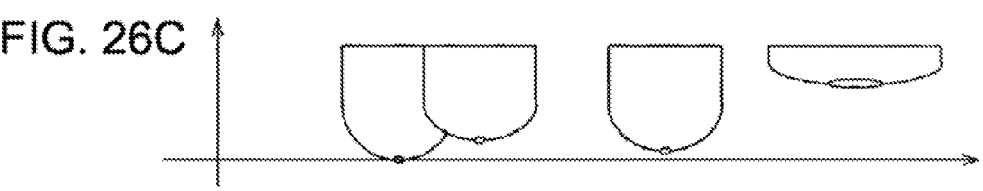
Figure 26D:
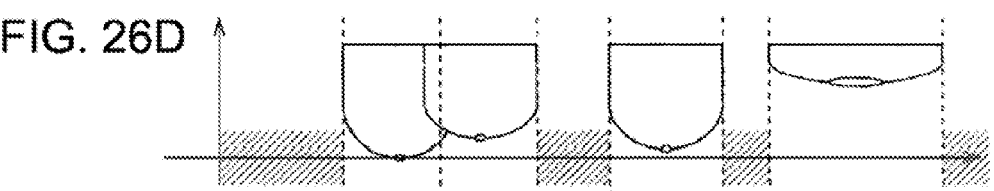
Figure 26E:
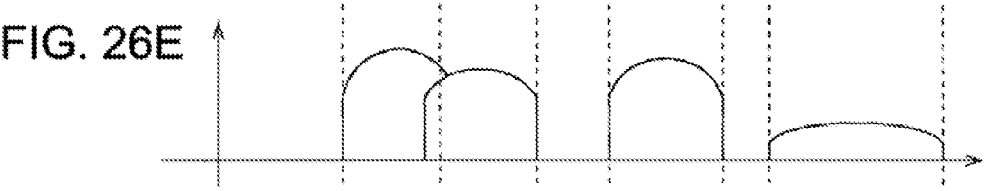

Thereafter, as shown in FIG. 26C, the CPU 4 detects local minimum values from the inverted histogram. In FIG. 26C, the detected local, minimum values are denoted by open circles. Thus, the CPU 4 detects a peak value of each mountain-like distribution segment in the above-described manner. The detected local minimum value of each mountain-like distribution segment is set as a seed of a watershed, and boundaries between mountain-like distribution segments are defined by watersheds, as shown in FIG. 26D. In FIG. 26D, boundaries between mountain-like distribution segments are represented by broken lines. In shaded regions, there are no occurrences.

Thereafter, as shown in FIG. 26F, the CPU 4 classifies the motion vectors according to the mountain-like distribution segments partitioned by the boundaries defined in the above-described manner. In the present embodiment, mountain-like distribution segments are divided by defining the boundaries by the image region segmentation method as described above thereby correctly separating a mountain-like distribution segment of a background from a mountain-like distribution segment of a subject even in a case where the background and the subject are similar in motion, and thus, it is ensured that the camera motion vector can be detected with high accuracy.

Next, in step SP64, the CPU 4 detects a mountain-like distribution segment corresponding to the background from the mountain-like distribution segments divided in the above-described manner. More specifically, the CPU 4 detects the mountain-like distribution segment corresponding to the background on the basis of the class information described in the feature point information.

FIG. 1 is a flow chart illustrating the details of the background peak detection process in step SP64, If the CPU 4 starts the background peak detection process in step SP71, then in step SP72, the CPU 4 determines whether the current frame is an initial frame for which motion vectors have been detected. If the answer to step SP72 is yes, the process proceeds from step SP72 to step SP73. In this specific case, the current frame is the initial frame for which motion vectors have been detected, and the class information is set to "unclassified" for all motion vectors. Thus, in this case, in step SP75, the CPU 4 sets the highest mountain-like distribution segment as the mountain-like distribution segment corresponding to the background. Thereafter, the CPU 4 controls the processing flow to proceed to step SP74 to end the process. Note that in a feature point class updating process described below, the class information is set to the "background feature point" class for feature points of motion vectors belonging to the mountain-like distribution segment determined as corresponding to the background, and the class information of the other feature points is set to the "non-background feature point." class.

In the case where the answer to step SP72 is no, the CPU 4 controls the processing flow to proceed from step SP72 to step SP75. In step SP75, the CPU 4 calculates the background peak likelihood indicating the likelihood of being a background for each peak, on the basis of the class information described in the feature point information.

Figure 27A:
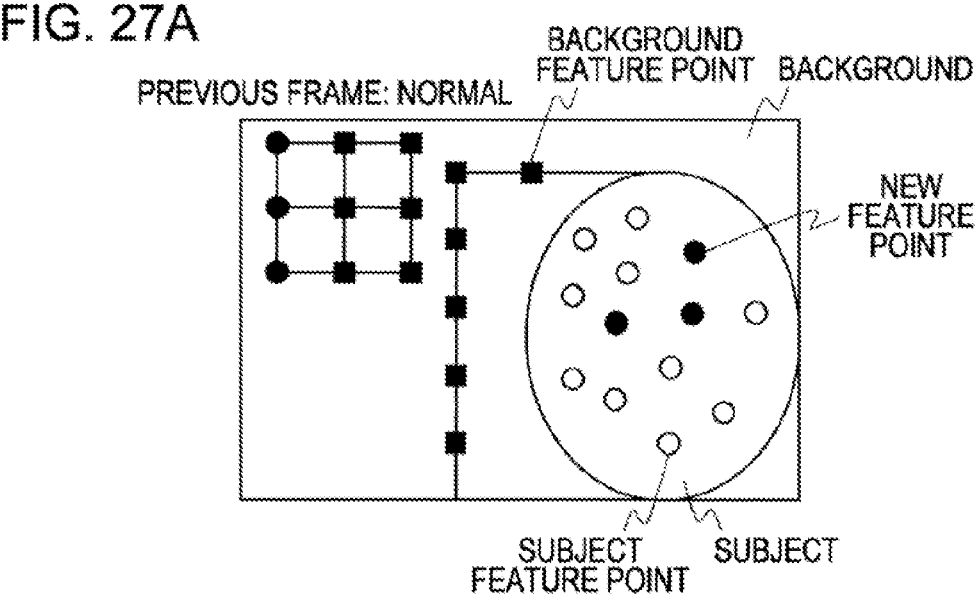
FIGS. 27A and 27B are diagrams illustrating a peak extraction process.

In this specific case, as a result of tracking/adding of feature points in the motion vector calculation process, feature points set in the input image have been classified as background feature points, non-background feature points or unclassified feature points, as shown, in FIG. 27A. That is, there is a mixture of all these three types of classes. Hereinafter, feature points classified as "background feature points", "non-background feature points", and "unclassified feature points" are respectively represented by solid squares, open circles, and solid circles.

Figure 27B:
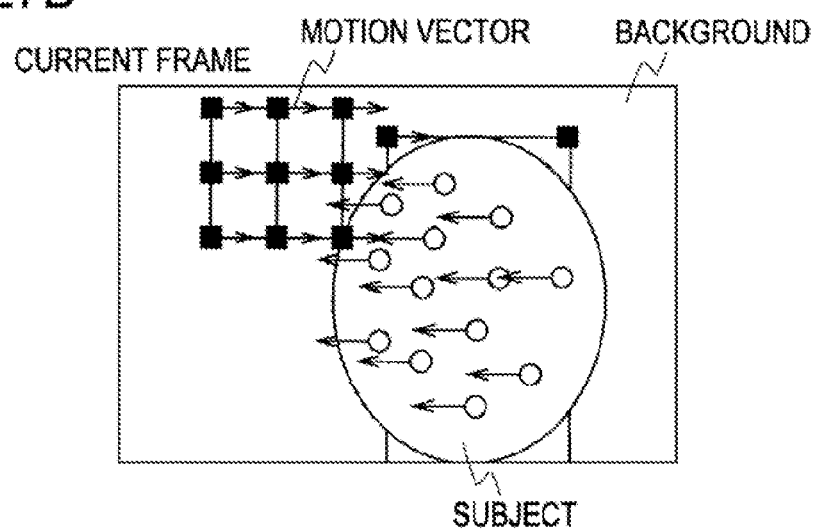
Figure 28:
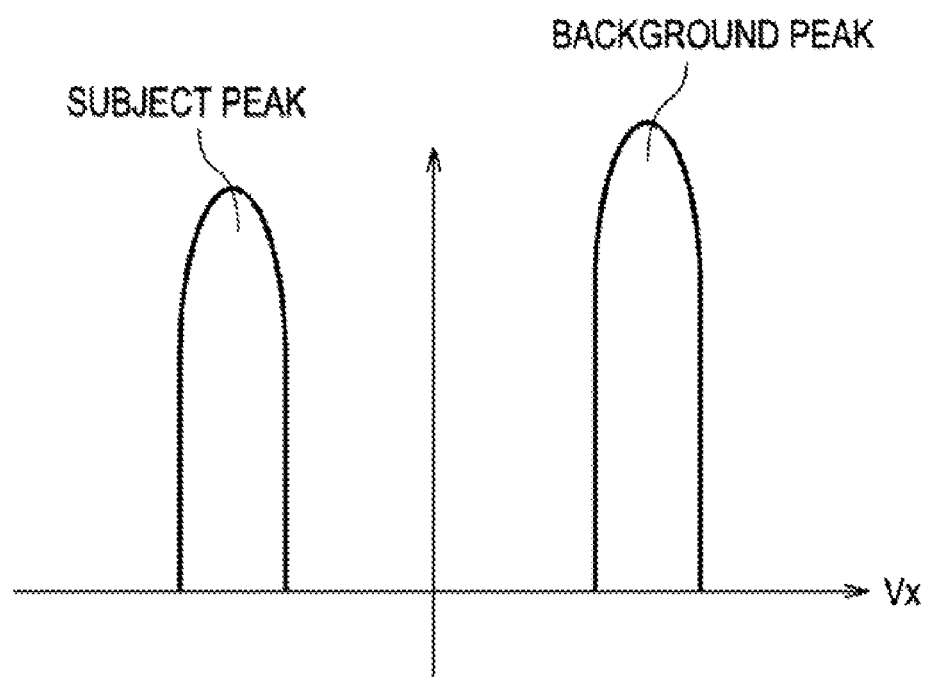
FIG. 28 is a histogram produced in the example of the peak extraction process shown in FIGS. 27A and 27B.

Herein, for example, assume that the camera is being panned, and a subject having feature points classified as "non-background feature points" is moving very differently from the panning motion, as shown in FIG. 27B. In this case, as shown in FIG. 28, a mountain-like distribution segment corresponding to a background and a mountain-like distribution segment corresponding to the subject can be detected in a clearly separate manner in a histogram. Thus, in this case, the mountain-like distribution segment corresponding to the background can be correctly detected by detecting a mountain-like distribution segment having a greatest height from mountain-like distribution segment as in step SP73.

However, as a result of movement of the subject, if the subject comes to occupy a greater area on the screen than the background, the selection of the highest mountain-like distribution segment can cause the mountain-like distribution segment corresponding to the subject to be incorrectly determined as the mountain-like distribution segment corresponding to the background, and thus an error can occurs in the detection of the camera motion vector.

Even when a mountain-like distribution segment has a height smaller than that of another mountain-like distribution segment, if this mountain-like distribution segment is dominated by motion vectors of feature points classified as "background feature points" by the class information, the mountain-like distribution segment is very likely to correspond to the background. The greater the domination degree, the more likely the mountain-like distribution segment corresponds to the background. Conversely, when a mountain-like distribution segment is dominated by motion vectors of feature points classified as "non-background feature points", there is a low probability that this is a mountain-like distribution segment corresponding to a background. In this case, the greater the domination degree of the feature points classified as "non-background feature points", the less likely the mountain-like distribution segment is that corresponding to the background even if the mountain-like distribution segment has a great height. That is, the greater the relative number of motion vectors classified as "background feature points" by the class information in a mountain-like distribution segment, the more likely the mountain-like distribution segment is a mountain-like distribution segment corresponding to a background.

Thus, if the ratio of the number of feature points classified as "background feature points" to the total number of feature points is calculated for each mountain-like distribution segment, and a mountain-like distribution segment having a greatest ratio is detected, it is possible to correctly detect a mountain-like distribution segment corresponding to a background even when movement of a subject causes the subject to have a greater area than the area of the background on the screen.

Figure 29A:
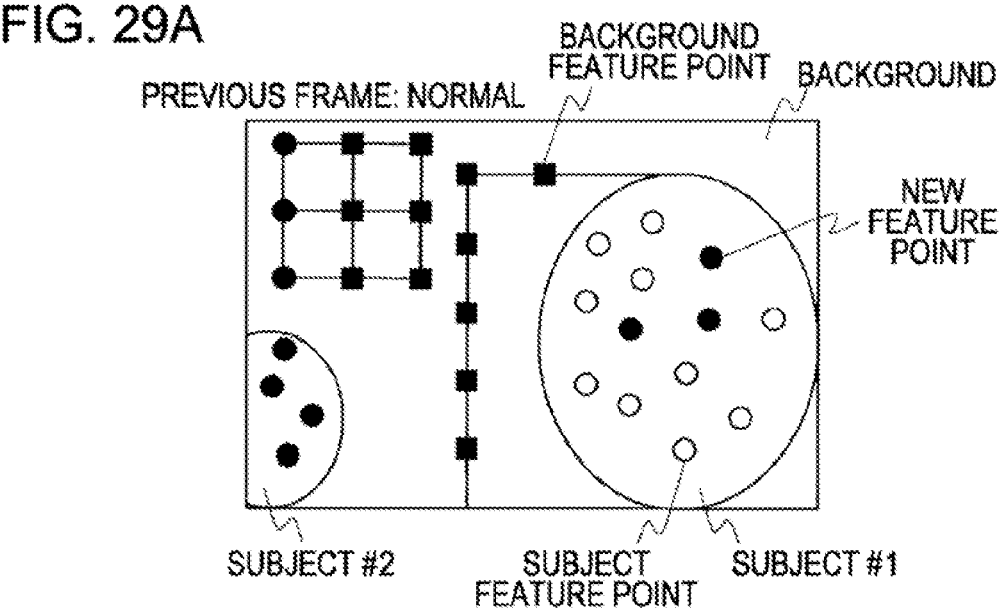
FIGS. 29A and 29B are diagrams illustrating an example in which a reduction in the area of a background occurs.
Figure 29B:
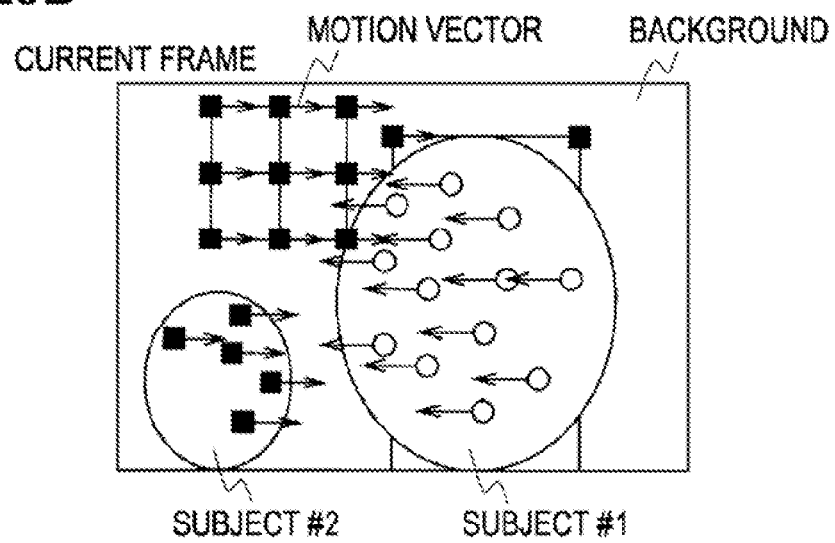
Figure 30A:
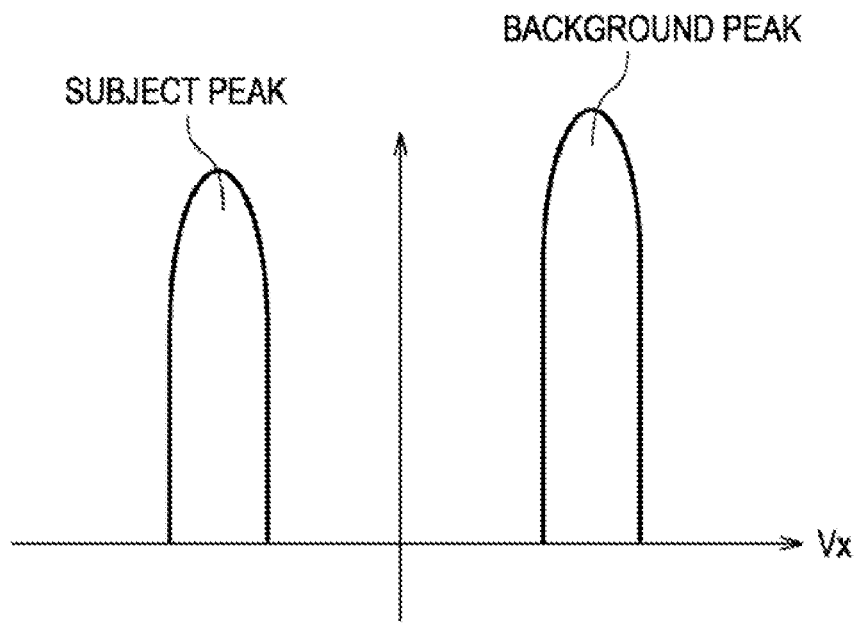
FIGS. 30A and 30B are histograms produced in the example shown in FIGS. 29A and 29B.
Figure 30B:
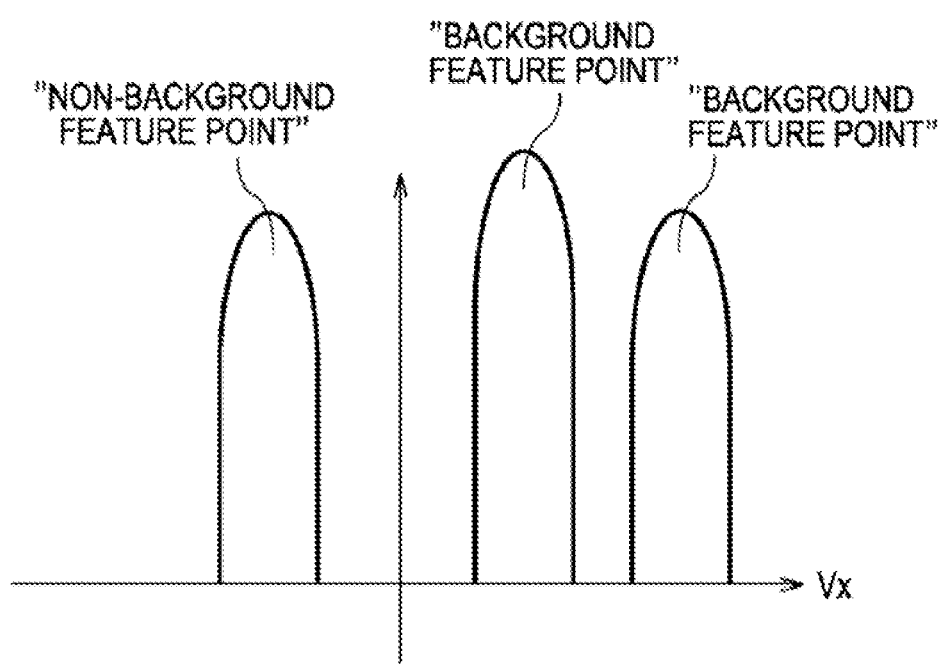

As shown in FIG. 29, there is a possibility that another subject (denoted by #2 in FIG. 29) at rest can start move (see also FIG. 21 for comparison). In this case, feature points detected from the subject #2 were detected as those of a background at rest in previous frames as shown in FIG. 30A, and thus these feature points have been classified by the class information as "background feature points". Thus, as shown in FIG. 30B, two mountain-like distribution segments having feature points classified as "background feature points" by class information appear in the histogram. Therefore, it is difficult to correctly detect a mountain-like distribution segment corresponding to a background by simply detecting a mountain-like distribution segment, having a large number of feature points classified as "background feature points".

However, in this case, the mountain-like distribution segment having feature points previously determined as corresponding to the background at rest is smaller in area and has a smaller number of feature points than the mountain-like distribution segment actually corresponding to the background. In view of the above, the CPU 4 calculates a background peak likelihood RP indicating the likelihood of being a mountain-like distribution segment corresponding to a background, for each mountain-like distribution segment, from the ratio of the number of background feature points to the total number of feature points of the mountain-like distribution segment and the greatness of the total number of feature points. The CPU 4 evaluates the calculated background peak likelihoods RP of mountain-like distribution segments and detects a mountain-like distribution segment corresponding to a background. More specifically, the CPU 4 calculates RP=RH×K for each mountain-like distribution segment, where RH is the ratio of the number of motion vectors of background feature points to the total number of motion vectors included in a mountain-like distribution segment of interest, and K is a coefficient which takes a value of 1 when the number of motion vector Ls of the mountain-like distribution segment of interest is equal to or greater than a predetermined threshold value thfp, but takes at value of 0 when the number of motion vector Ls of the mountain-like distribution segment of interest is smaller than the predetermined threshold value thfp. Note that K may take three or more values. Use of the background peak likelihood RP in the determination of the background minimizes the probability that a motion vector which does not belong to a background is incorrectly classified as belonging to the background in the partitioning of mountain-like distribution segment using the image region segmentation method.

In the calculation of the background peak likelihood RP, the background peak likelihood RP may be weighted in accordance with the confidence level of class information, as with the production of the histogram. The confidence level may be given by the number of times that the process has successively succeeded in tracking a background or by the number of times that the process has successively succeeded in tracking a non-background object. In the case where the confidence level is given by the number of times the process has successively succeeded in tracking a feature point as a background feature point (hereinafter referred to simply as the number of successful tracking operations), the weighting factor may be determined depending on the number of successful tracking operations, for example, such that the weighting factor is set to 1 when the number of successful tracking operations is 3, and the weighting factor is increased/decreased as increasing/decreasing number of successful tracking operations. The average of weighting factors assigned to motion vectors in a mountain-like distribution segment classified by the attribute information as belonging to a background is calculated, and the average is employed as a final value of the weighting factor to be multiplied with the background peak likelihood RP. In the case where the confidence level is given by the number of times the process has successively succeeded in tracking a feature point as a non-background feature point, the weighting factor may be determined depending on the number of successful tracking operations, for example, such that the weighting factor is set to 1 when the number of successful tracking operations is 3, and the weighting factor is decreased/increased as increasing/decreasing number of successful tracking operations.

Alternatively, the confidence level may be determined based on a change in distance to nearby feature points. In this case, when a great change is detected in distance to nearby feature points, it is determined that the likelihood of being a background is low. Thus, as in the case where the confidence level is given by the number of times that the process has successively succeeded in tracking a non-background object, the weighting factor is determined in accordance with the degree of change in distance, and the background peak likelihood RP is weighted.

The CPU 4 sets a mountain-like distribution segment having highest background peak likelihood RP as a mountain-like distribution segment corresponding to a background, and sets other mountain-like distribution segments as those corresponding to non-background objects.

Figure 31A:
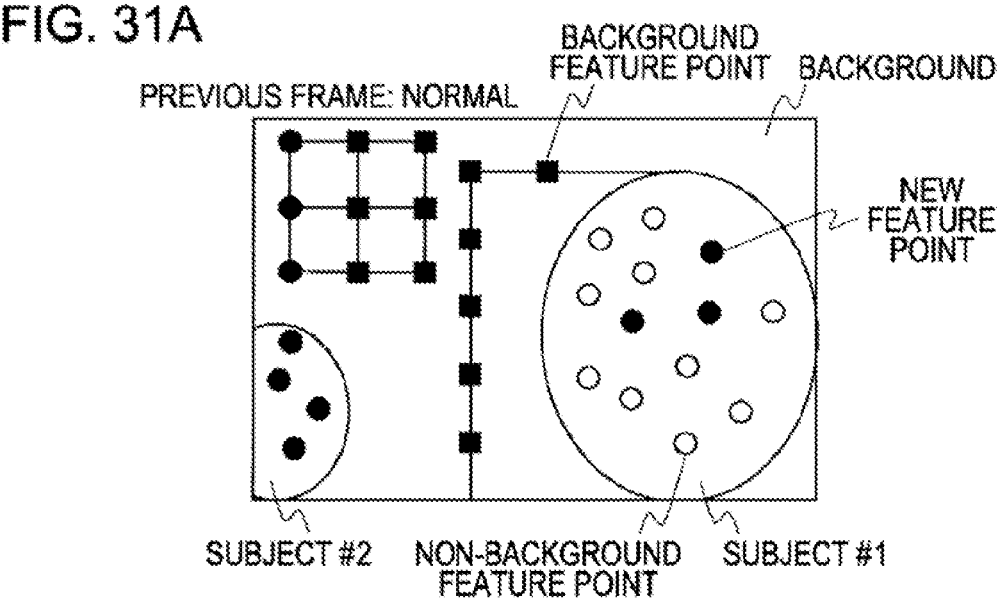
FIGS. 31A and 31B are diagrams illustrating a feature point class updating process in a motion vector analysis process.

Next, in step SP65 (FIG. 25), as shown in FIGS. 31A and 313 (see also FIGS. 29A and 29B for comparison), the CPU 4 sets the class information as "background feature points" for feature points classified as a mountain-like distribution segment in the feature point classification process, and sets the class information as "non-background feature points" for the other feature points.

Figure 32:
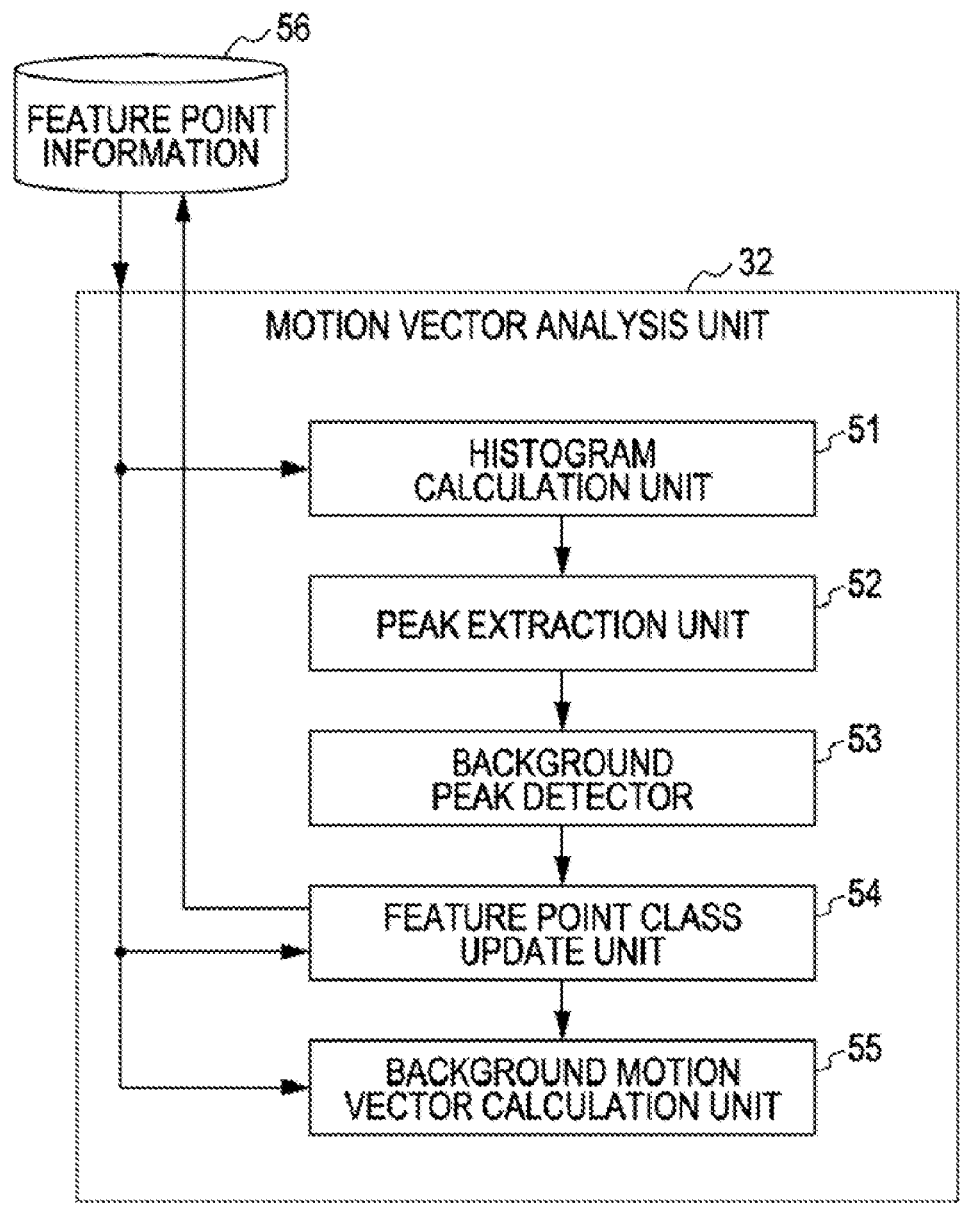
FIG. 32 is a functional block diagram corresponding to the process shown in FIG. 25.

Next, in step SP66, the CPU 4 performs a background motion vector calculation process to calculate the motion of the background from the motion vectors classified, as being in the mountain-like distribution segment corresponding to the background. In step SP 67, the current process is ended. By performing the process shown in FIG. 25, the CPU 4 implements functional blocks shown in FIG. 32. In the functional block diagram shown in FIG. 32, a histogram calculation unit 51, a peak extraction unit 52, a background peak detection unit 53, a feature point class updating unit 54, and a background motion vector calculation unit 55 are functional blocks corresponding to steps SP62, SP63, SP64, SP65, and SP66.

Figure 33:
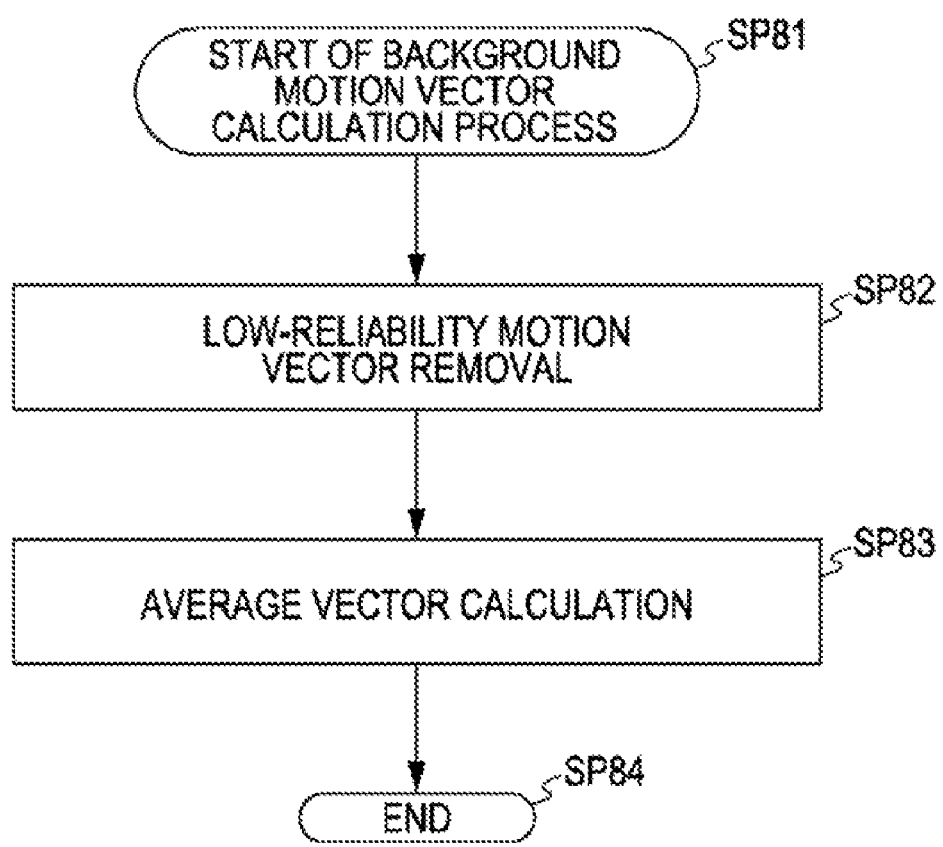
FIG. 33 is a flow chart illustrating a background motion vector calculation process in a motion vector analysis process.

FIG. 33 is a flow chart illustrating the details of the background motion vector calculation process in step SP66. If the CPU 4 starts the background motion vector calculation process in step SP81, then in step SP82, the CPU 4 removes motion vectors with low reliability from motion vectors detected at feature points classified as "background feature points" by class information set in the feature point class updating process in step SP65, thereby select, suitable motion vectors.

More specifically, the CPU 4 statistically analyzes the distribution of motion vectors detected at feature points classified as "background feature points". In the analysis of the distribution, the CPU 4 detects the center of the distribution, and removes motion vectors whose distance from, the center of the distribution is greater than a predetermined threshold value so that such motion vectors will not be processed.

More specifically, the CPU 4 determines an average vector by calculating the average of motion vectors detected at feature points classified as "background feature points" by the class information. The CPU 4 then produces a standard deviation matrix from the motion vectors. The standard deviation matrix is a diagonal matrix of standard deviations of horizontal and vertical components of motion vectors. Hereinafter, the standard deviation matrix will also be referred to as a standard deviation vector.

The CPU 4 then multiplies the horizontal component Sx and the vertical component Sy of the standard deviation vector by a predetermined threshold value th. The resultant products Sx×th and Sy×th are respectively used as a critical horizontal component value and a critical vertical component value. The horizontal cooper etc Mx of the average vector is subtracted from the horizontal component Vx of a motion vector V of interest under test, and the absolute value of the result of the subtraction, Vx−Mx, is compared with the critical horizontal value Sx−th. If the comparison indicates that the horizontal distance of the motion vector of interest from the center of the distribution is greater than the critical horizontal value Sx×th, this motion vector is discarded. This test is performed for all motion vectors.

Motion vectors surviving after the above-described test are then tested in terms of their vertical component as follows. That is, the vertical component My of the average vector is subtracted from the vertical component Vy of a motion vector of interest under test, and the absolute value of the result of the subtraction, Vy−My, is compared with the critical vertical value Syxth. If the comparison indicates that the vertical distance of the motion vector of interest from the center of the distribution is greater than the critical vertical value Syxth, this motion vector is discarded. This test is performed for all surviving motion vectors.

The critical horizontal and vertical values may be varied in response to a change in the distribution of motion vectors with time. More specifically, for example, a change in the standard deviation with time is detected, and the threshold value th by which the critical values are determined is changed with time.

After only correct motion vectors have been selected in the above-described manner, the process proceeds in step SP83. In step SP83, the CPU 4 calculates the average of the surviving motion vectors and employs the result as the motion vector of the background. The CPU 4 inverts the sing of the motion vector of the background, and employs the result as the camera motion vector MVC.

Figure 34:
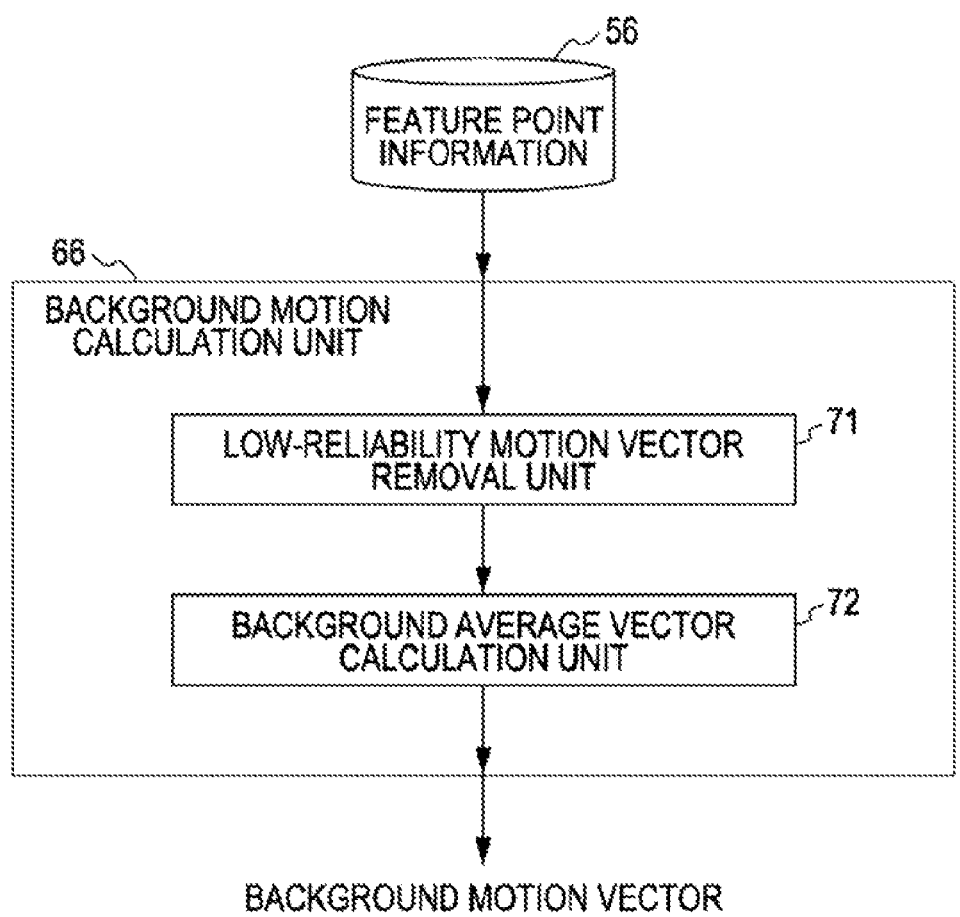
FIG. 34 is a functional block diagram corresponding to the process shown in FIG. 33.
Figure 35A:
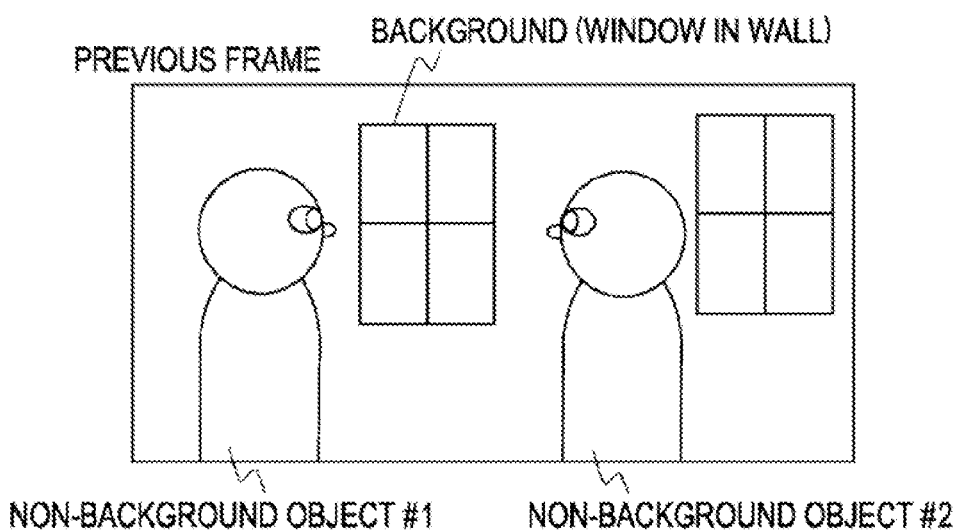
FIGS. 35A and 35B are diagrams illustrating a relationship between a subject and a background.
Figure 35B:
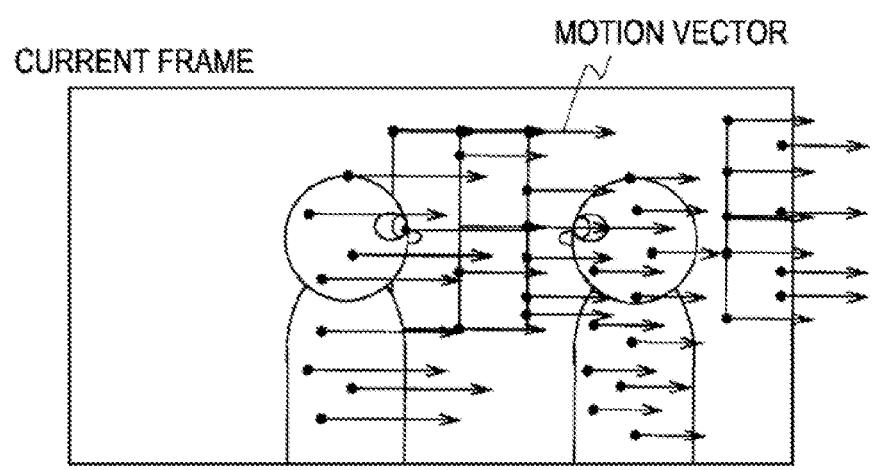

By performing the process shown in FIG. 33, the CPU 4 implements functional blocks shown in FIG. 34. In the functional block diagram shown in FIG. 34, a low-reliability motion vector removal unit 71 and an average background vector calculation unit 72 are functional blocks respectively corresponding to steps SP82 and SP83 in FIG. 33.

Operation

In the camera shake compensation apparatus 1 (FIG. 2) configured in the above-described manner, the video signal SV output from the television camera 2 is first downloaded in the hard disk drive 3, and the downloaded video signal SV is subjected to the camera shake compensation process (FIGS. 3 to 7) performed by the CPU 4 in accordance with a processing program stored in the hard disk drive 3. The resultant video signal is output to an external device.

In the camera shake compensation process, the video signal SV is converted from interlace format into progression format and is processed in units of frames. Motion vectors of various parts are detected for successive frames, and the detected motion vectors are analyzed to detect the camera motion vector MVC including the hand-shake motion component and the camera-work motion component represented on the input image. Furthermore, by analyzing the detected camera motion vector MVC, the camera motion vector MVCT indicating the motion of the camera due to only the camera work represented on the input image is detected. The camera shake compensation vectors ΔMV are sequentially calculated from the camera motion vectors MVC and MVCT, and the motion of respective frames of the video signal SV is compensated for in accordance with the compensation vectors ΔMV (FIGS. 8 and 9).

In the above-described process of detecting the camera motion vector MVC including the hand-shake motion component and the camera-work motion component, the camera motion vector MVCT is detected on the assumption that a background has a greatest area in the input image, such that the histogram of motion vectors detected at various points of the input image is first produced, and a group of motion vectors the number of which is the greatest of all groups is detected and determined as a group corresponding to the background. The average of the motion vectors belonging to the group corresponding to the background is calculated, and the resultant average motion vector is employed as the camera motion vector MVCT.

Thus, in the present embodiment, in order to correctly detect the background, it is desirable that motion vectors foe evenly detected from various parts of the input image so that the number of motion vectors is proportional to the area of the respective parts of the input image. If the background is not correctly detected, it becomes difficult to correctly detect the camera motion vector MVCT including only the camera-work motion component. Thus, it is desirable to detect motion vectors evenly over the input image.

In view of the above, in the present camera shake compensation apparatus 1, motion vectors of various parts of the input image are detected using the KLT feature point extracting and tracking method, and each frame of the input image of the video signal SV is divided into a plurality of blocks (step SP23 in FIG. 10). In an initial frame, a predetermined, number Nfp of feature points is set in each block (step SP25 in FIG. 10). In successive frames following the initial frame, motion vectors are detected by tracking the feature points set in the initial frame (step SP28 in FIG. 10). In these successive frames of the input, image, feature points difficult to track and feature paints closer than the predetermined distance value to adjacent feature points are removed. Feature points are added to each block so that each block has as many feature points as the initial number Nfp of feature points (step SP25 in FIG. 10) thereby correcting an uneven distribution of feature points.

Thus, in the present camera shake compensation apparatus 1, by performing the process in the above-described manner, it is possible to detect motion vectors, the number of which is substantially equal to the initially specified number Nfp of feature points, from each block even when a background is partially hidden behind an object or even when a background partially goes out of a frame. Thus, it is possible to detect motion vectors evenly over each frame (FIGS. 10 to 17). The detection of motion vectors via the feature point extracting and tracking process based on the KLT method makes it possible to detect motion vectors more accurately than possible by a block matching method. Thus, if is possible to accurately detect motion vectors evenly over the entire screen.

More specifically, for the input image of the video signal SV, feature points are tracked over successive frames using the KLT tracking method. If it is detected that two feature points have come closer to each other beyond the predetermined minimum space, a feature point with a less feature-point likelihood value is deleted to prevent an uneven distribution of feature points (step SP28 in FIG. 10). In the above process, if feature points which are difficult to track are detected, they are also deleted.

For each frame of the input image of the video signal SV, coordinates of respective pixels are listed, together with their feature-point likelihood values in the order of decreasing feature-point likelihood values indicating likelihood of being feature points, thereby producing a feature point list indicating candidates for feature points in the order of decreasing feature-point likelihood values (FIG. 23). A feature point map is then produced by arranging the feature-point likelihood values at locations corresponding to the locations of the pixels of the input image (FIG. 23).

In successive frames other than the initial frame of the input image of the video signal, if the number of feature points becomes smaller than the initial number as a result of deletion of feature points, feature points are selected in the order of decreasing feature-point likelihood values and added to blocks having a smaller number of feature points than the initially specified number, Nfp, of feature point (steps SP55, SP56, SP57, and SP55 in FIG. 22). In the above process, it is confirmed that added feature points are spaced apart by a predetermined minimum distance or greater from any existing feature points (step SP59 in FIG. 22).

Thus, a reduction in density of feature points is prevented, and an even distribution of feature points is achieved. In the above-described process of adding feature points at locations spaced apart by the predetermined minimum distance or greater from existing feature points, because feature points to be added are selected in the order of decreasing feature-point likelihood values, it is possible to detect motion vectors with high accuracy not only for existing feature points but also for the newly added feature points by the KLT tracking method.

More specifically, in the camera shake compensation apparatus 1, the work list indicating the number of feature points of each block is produced from the block list in which information associated with respective blocks is described (step SP34 in FIG. 18). Blocks satisfying the condition that, the number of feature points be equal to the initially specified number Nfp are removed from the work list (step SP35 in FIG. 18). As a result, blocks including a smaller number of feature points than the specified number Nfp are extracted in the work list.

The blocks extracted in the work list are then grouped in accordance with the number of feature points to be added to achieve the initially specified number Nfp, and groups are sorted in the work list in the order of decreasing number of feature points to be added (step SP36 in FIG. 18). Thus, in the present camera shake compensation apparatus 1, the order of processing groups to add feature points is set in the work list. In accordance with the work list, feature points are added to respective blocks so that each block includes the specified number of feature points.

Thus, in the present camera shake compensation apparatus 1, the process of adding feature points may be limited according to various conditions in order to increase the processing speed, while correcting the uneven distribution of motion vectors by adding feature points to blocks preferentially in the order of decreasing number of feature points to be added. Blocks may be listed and sorted in accordance with the number of feature points to be added. This makes it possible to quickly and simply determine the order of processing blocks.

More specifically, for example, in the present camera shake compensation apparatus 1, the process of adding feature points may be limited such that feature points are allowed to be added within the range in which the total number of feature points of one frame is not greater than the initially set total number Ntot. This restriction makes it possible to correct the uneven distribution of motion vectors by the simplified, process of adding feature points.

In the above process, in each group in the work list, the order of processing blocks may be randomized, and adding of feature points may be performed in the randomized order within the range in which the total number of feature points in one frame does not exceed the initially set total number Ntot. This prevents feature points from being added evenly to a particular block such as that located on the left-hand end of the screen.

In the process of adding feature points, each time one feature point is added, the work list is updated, and it is confirmed that the resultant total number of feature points of one frame is not greater than the initially set total number, Ntot, of feature points. This allows feature points to be added without causing an uneven distribution of feature points and thus without causing an uneven distribution of motion vectors. The placing of a block, to which a feature point has been added, at the end of the randomised arrangement, of blocks also contributes to preventing an uneven distribution of feature points and thus an uneven contribution of motion vectors.

In the input image, depending on motion of a subject, the area of a background can be smaller than the area of the subject, and/or motion of the background can be similar to the motion of the subject. In such a case, even if motion vectors are detected evenly over the entire frame of the input image, simple detection of the camera motion vector based on the assumption that a group of including a greatest number of samples of motion vectors on the histogram is a group corresponding to a background does not necessarily allow if to correctly detect motion of the background. That is, in this case, degradation in detection accuracy of background motion can occur, which makes it difficult to correctly detect motion of the camera.

In view of the above, in the present camera snake compensation apparatus 1, only when a background is detected in au initial frame, a mountain-like distribution segment having a great height is detected from the distribution of motion vectors on the histogram (step SP73 in FIG. 1), and the detected mountain-like distribution segment of motion vectors is assumed to be a mountain-like distribution segment corresponding to a background. The camera motion vector MVC is then determined by calculating the average of the motion vectors belonging to this mountain-like distribution segment corresponding to the background.

The class information is then written to indicate that feature points belonging to the mountain-like distribution segment of motion vectors determined to correspond to the background are classified as background feature points, and the other feature points are classified as non-background feature points (see FIG. 24 and step SP65 in FIG. 25).

In following frames, a mountain-like distribution segment of motion vectors detected from a background is detected on the basis of the class information defined in the above-described manner. If a mountain-like distribution segment is detected, the attribute information is rewritten. For added feature points, class information is defined (steps SP75 and SP76 in FIG. 1).

Thus, in the present camera shake compensation apparatus 1, even if a mountain-like distribution segment determined in the past as corresponding to a background has a reduction in the number of motion vectors due to a reduction in the area of the background, the mountain-like distribution segment corresponding to the background can be correctly tracked on the histogram, and thus the mountain-like distribution segment can be correctly detected. Thus, even if a reduction in the area of a background occurs, it is possible to correctly detect the background and thus correctly detect, the camera motion vector.

Furthermore, in the camera shake compensation apparatus 1, when a mountain-like distribution segment corresponding to a background is detected from the histogram, if the histogram includes a plurality of mountain-like distribution segments, the histogram is divided into a plurality of parts corresponding to the respective mountain-like distribution segments by using the image region segmentation method (step SP63 in FIG. 25, see also FIG. 26), and a mountain-like distribution segment corresponding to a background is detected from the plurality of mountain-like distribution segments (step SP64 in FIG. 25). Thus, in the present camera shake compensation apparatus 1, even in the case where a subject moves in a similar manner to a background and thus a mountain-like distribution segment corresponding to the background and a mountain-like distribution segment corresponding to the subject partially overlap, it is possible to distinguish between these two mountain-like distribution segments. Thus, when the subject moves in a similar manner to the background, it is possible to prevent degradation in detection accuracy of the motion of the background.

More specifically, in the present camera shake compensation apparatus 1, magnitudes of motion vectors detected for various parts of the input image are normalized by a resolution rez of the histogram, and the histogram is produced for the normalized values. This makes it possible to easily detect the camera motion vector with a desired resolution.

A plurality of mountain-like distribution segments on the histogram are partitioned by the watershed method (FIG. 26). That is, the histogram is inverted, and local minimum values in the inverted histogram are set as seeds of watersheds whereby the plurality of mountain-like distribution segments are partitioned into individual mountain-like distribution segments. Thus, in the present camera shake compensation apparatus 1, even when motion of a subject changes in various manners, it is possible to correctly partition mountain-like distribution segments from each other, whereby it is possible to correctly detect motion of respective parts.

In the process of detecting a mountain-like distribution segment corresponding to a background from a plurality of mountain-like distribution segments, in an initial frame, the mountain-like distribution segment corresponding to the background is detected based on the height of mountain-like distribution segments. In following frames, the background peak likelihood EP indicating likelihood of being a mountain-like distribution segment corresponding to a background is calculated for each mountain-like distribution segment (step SP75 in FIG. 1), and a mountain-like distribution segment having a greatest background peak likelihood RP is selected as the mountain-like distribution segment corresponding to the background (step SP75 in FIG. 1).

More specifically, in the camera shake compensation apparatus 1, the background peak likelihood RP is given by the product of a predetermined coefficient K and the ratio of the number of motion vectors classified as corresponding to a background to the total number of motion vectors included in the mountain-like distribution segment. That is, the background peak likelihood RP is calculated on the basis of the relative number of background feature points in accordance with the class information, and a mountain-like distribution segment dominated by feature points very likely to have been determined to correspond to a background is detected as the mountain-like distribution segment corresponding to the background. Thus, even in the case where motion of a subject changes in various manners, it is possible to correctly detect the motion of the background.

Figure 31B:
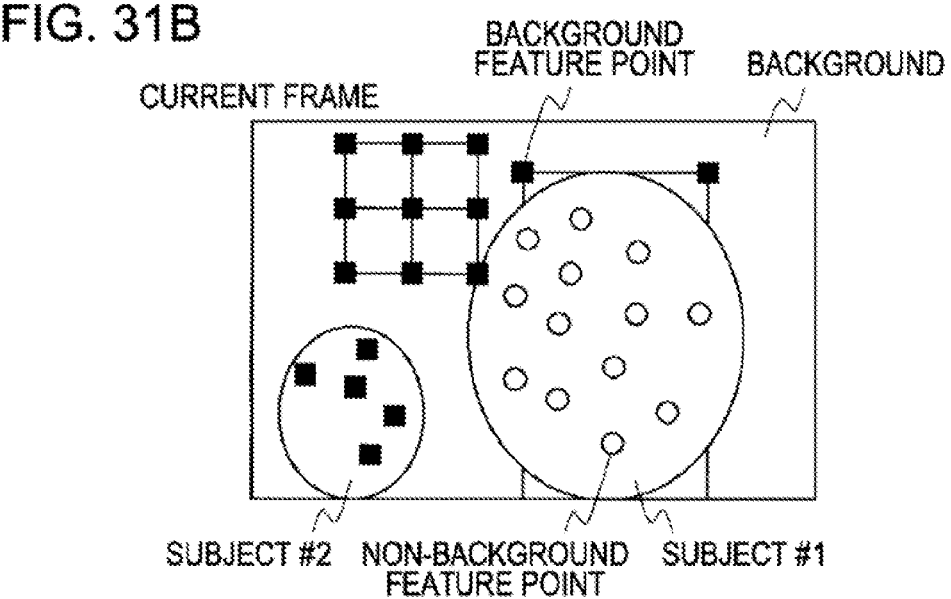

In the above process, when the total number of motion vectors in a mountain-like distribution segment is equal to or greater than a predetermined threshold value thfp, the coefficient K is set to 1. On the other hand, when the total number of motion vectors in a mountain-like distribution segment is smaller than the predetermined threshold value thfp, the coefficient K is set to 0. Because the coefficient K takes a value obtained by quantizing the height of a mountain-like distribution segment of interest by the threshold value thfp, the number of feature points is reflected in the detection of a mountain-like distribution segment corresponding to a background. For example, when a subject at rest starts to move (FIG. 31), the above-described method does not incorrectly detect the motion of this subject as motion of a background (FIGS. 29 and 30).

In the present process, as described above, the background peak likelihood RP is calculated based on the relative number of background feature points and the total number of feature points, and a mountain-like distribution segment corresponding to a background is detected on the basis of the background peak likelihood RP. In this process, when the histogram of motion vectors is produced, the confidence level indicating likelihood of being a feature point of a background may be calculated based on a property specific to background feature points, and counts of motion vectors on the histogram may be weighted so that the background peak likelihood RP varies depending on the confidence level. This allows an improvement in reliability in detecting a mountain-like distribution segment corresponding to a background.

More specifically, in the tracking of a feature point classified as a background feature point, the greater number of times the feature point has been successfully tracked in successive tracking operations, the more likely the feature point is of a background. Conversely, as for a feature point classified as a non-background feature point, the greater number of times the feature point has been successfully tracked in successive tracking operations, the less likely the feature point is of a background. Thus, it is reasonable that the confidence level is given by the number of successive tracking operations in which a feature points has been successfully tracked, and weighting is performed based on the confidence level to achieve higher reliability in the detection of a mountain-like distribution segment corresponding to a background.

In a background, most parts thereof move in a very similar manner. That is, the background is generally solid. This means that, in a background, the distance from a feature point to an adjacent feature point is maintained unchanged for any frame. Therefore, the degree of change in distance between a feature point of interest and an adjacent feature point can be used as the confidence level, and weighting can be performed in accordance with the confidence level to achieve higher reliability in the detection of a mountain-like distribution segment corresponding to a background. In the case where the histogram is produced taking into account the confidence level in the above-described manner, the process including the detection of a mountain-like distribution segment corresponding to a background from the histogram is performed based on the distribution of the motion vectors on the histogram produced in the above-described manner.

The weighting according to the confidence level may be performed such that counts of motion vectors on the histogram are weighted according to the confidence level. Alternatively, the background peak likelihood of each mountain-like distribution segment, which is a criterion for detecting a mountain-like distribution segment corresponding to a background, may be weighted according to the confidence level.

In the present camera shake compensation apparatus 1, the average of motion vectors included in the mountain-like distribution segment of the background detected in the above-described manner is calculated, and the resultant average of the motion vectors is used as the motion vector of the background. The sing of the motion vector of the background is inverted, and the resultant inverted vector is used as the camera motion vector MVC including a camera-work motion component and a hand-shake motion component.

In the calculation of the average of the motion vectors, motion vectors highly likely to foe incorrectly classified as belonging to a mountain-like distribution segment corresponding to a background are removed from the group of background motion vectors so that they are not subjected to the calculation of the average. That is, the average of the remaining motion vectors is calculated. This results in an improvement in detection accuracy of the camera motion vector.

More specifically, the average of the motion vectors included in a mountain-like distribution segment determined to correspond to a background is calculated, thereby determining the center of the mountain-like distribution segment. The distance from this center of the mountain-like distribution segment with respect to a predetermined threshold value is evaluated, and motion vectors whose distance from the center is greater than the threshold value are removed so that they will not foe processed. This results in an improvement in detection accuracy of motion of a background and thus an improvement in detection accuracy of the camera motion vector.

In the above process, the threshold value used as the criterion for evaluating the distance may be set depending on the standard deviation of motion vectors belong to a mountain-like distribution segment regarded as belonging to a background. In this case, for example, when a background includes trees with branches and leaves swaying in the wind, the threshold for evaluating the distance is set to a large value. On the other hand, when a background is solid as in the case of a wall of a building or the like, the threshold for evaluating the distance is set to a small value, and unsuitable motion vectors are removed in accordance with the threshold value. Thus, the threshold value is varied depending on the background to remove motion vectors highly likely to be incorrectly classified as belonging to the background thereby achieving higher detection accuracy of motion of the background.

The threshold value used as the criterion for evaluation may be varied depending on a change with time in the distribution of vector motions to achieve higher detection accuracy. For example, when a background includes trees swaying in the wind, the degree of swaying varies with time depending on the strength of the wind. In this case, the standard deviation of motion vectors detected in the background changes with time. Thus, in this case, the threshold value used as the criterion for evaluation may be varied with time depending on the change in the distribution to achieve higher detection accuracy. The threshold value used as the criterion for evaluation may be varied in accordance with the confidence level determined based on the number of successive tracking operation or based on the degree of change in distance to adjacent pixels, so that the average of motion vectors is calculated taking into account the result of successive tracking operations thereby achieving higher detection accuracy.

The embodiments of the present invention described above provide great advantages as follows. That is, in the embodiments of the present invention described above, a histogram of motion vectors detected at feature points in various parts of an input image is produced, and motion vectors are classified based on the histogram. The motion of a particular part is detected based on motion vectors detected in the particular part. In the above process, motion vectors may be classified based on class information indicating a class determined in the past for each motion vector, and the motion of the camera is detected based on the motion vectors detected in various parts of the screen. This allows an improvement in detection accuracy of the motion of the camera.

In the above process, a plurality of mountain-like distribution segments on the histogram are partitioned by the image region segmentation method, and a mountain-like distribution segment corresponding to a particular part such as a background is detected. In this method, even when the image includes a subject moving in a similar manner to the particular part, it is possible to correctly detect the mountain-like distribution segment corresponding to the particular part and thus correctly detect the motion of the particular part.

By calculating the confidence level indicating the reliability of the class information and producing the histogram based on the confidence level, it becomes possible to more reliably detect the mountain-like distribution segment corresponding to the particular part, and thus a further improvement in detection accuracy is achieved.

More specifically, by determining the confidence level based on the number of successive tracking operations in which a feature point of interest has been successfully tracked or based on the degree of change in distance between the feature point of interest and an adjacent feature point, and detecting the mountain-like distribution segment corresponding to the particular taking into account the confidence level, it becomes possible to achieve further improvement in detection accuracy.

More specifically, in an initial frame of an given image, a mountain-like distribution segment corresponding to a particular part is detected on the basis of the height of mountain-like distribution segments on the histogram, while, in following frames, the mountain-like distribution segment corresponding to the particular part is detected on the basis of the class information. Thus, by effectively using the result of detection made in the past, it is possible to achieve an improvement in detection accuracy of the particular part.

More specifically, the peak likelihood indicating the likelihood of being a mountain-like distribution segment corresponding to a particular part is calculated for each mountain-like distribution segment on the basis of the class information, and a mountain-like distribution segment having highest peak likelihood is detected and determined as the mountain-like distribution segment corresponding to the particular part. Thus, by effectively using the result of detection made in the past, it is possible to achieve an improvement in detection accuracy of the particular part.

In the above process, the peak likelihood may be given by the ratio of the number of feature points classified as belonging to a mountain-like distribution segment, corresponding to a particular part, or may be given by the product of the ratio of the number of feature points classified as belonging to the mountain-like distribution segment corresponding to the particular part and the value obtained by quantizing the height of the mountain-like distribution segment. Thus, by effectively using the result of detection made in the past, it is possible to achieve an improvement in detection accuracy of the particular part.

The peak likelihood may be weighted in accordance with the confidence level of the class information. More specifically, the confidence level is determined based on the number of successive tracking operations in which a feature point of interest has been successfully tracked or based on the degree of change in distance between the feature point of interest and an adjacent feature point, and a mountain-like distribution segment corresponding to a particular may be detected taking into account the confidence level. This makes it possible to achieve further improvement in detection accuracy.

In the calculation of the average of motion vectors belonging to a mountain-like distribution segment corresponding to a particular part, the distance from the center of the mountain-like distribution segment with respect to the predetermined threshold value may be evaluated, and motion vectors whose distance from the center of the mountain-like distribution segment is greater than the predetermined threshold value may be removed. After those motion vectors likely to be incorrectly classified are removed in the above-described manner, the average of remaining motion vectors is calculated. This results in a further improvement in detection accuracy.

The threshold value used as the criterion for evaluation of the distance may be determined in accordance with the standard deviation of motion vectors belonging to the mountain-like distribution segment. That is, in accordance with the threshold value determined depending on the background, motion vectors highly likely to be incorrectly classified as belonging to the background are removed, thereby achieving a further improvement in detection accuracy.

The threshold value used as the criterion for evaluation of the distance may be determined in accordance with the degree of change in the distribution of motion vectors in the mountain-like distribution segment. Also in this case, motion vectors highly likely to be incorrectly classified as belonging to the background are removed in accordance with the threshold value determined depending on the background, and a further improvement in detection accuracy is achieved.

In the above process, the confidence level of the class information may be calculated, and the threshold value used as the criterion for evaluation may be weighted in accordance with the confidence level. More specifically, the confidence level may be determined based on the number of successive tracking operations in which a feature point of interest has been successfully tracked or based on the degree of change in distance between the feature point of interest and an adjacent feature point, whereby the average of motion vectors is calculated taking into account the confidence level thereby achieving a further improvement in detection accuracy.

A frame of a given image may be divided into a plurality of blocks, and motion vectors may be detected by tracking feature points while correcting the distribution of feature points so that motion vectors are detected evenly over the entire screen, thereby achieving a further improvement in detection accuracy or the particular part.

Other Embodiments and Modifications

In the embodiments described above, a mountain-like distribution segment corresponding to a background is detected from one type of histogram, and the motion of the background is detected. However, the present invention is not limited to such a process, but a plurality of histograms with different resolution may be used. More specifically, for example, a mountain-like distribution segment with low resolution corresponding to a particular part is detected from a low-resolution histogram, and a mountain-like distribution segment corresponding to this low-resolution detected is detected from a low-resolution histogram whereby the motion of the background is detected. This allows a reduction in the time needed to process histograms.

In the embodiments described above, in an initial frame of a given image, a mountain-like distribution segment including a greatest number of feature points is determined as a mountain-like distribution segment corresponding to a background. However, in the present invention, there is no particular restriction on the manner of selecting a mountain-like distribution segment of a background, but a mountain-like distribution segment including feature paints corresponding to a peripheral area of the frame if the given image may be determined as a mountain-like distribution segment corresponding to a background. In this case, class information of feature points in the peripheral part of the input image may be defined, in advance such that the class information indicates that these feature points in the peripheral part are classified as background feature points, and, in the initial frame, a mountain-like distribution segment corresponding to the background may be detected in accordance with this class information.

In the embodiments described above, feature points are added within the range in which the total number of feature points of one frame is not greater than the initially set total number. However, the present invention is not limited to such a process, but feature points may be added within the range in which the total number of feature points of one frame is not greater than a particular value different from the initially set value. Alternatively, if available computation power allows a sufficiently high processing speed, the restriction on the maximum number of feature points per frame may be removed. If the restriction is removed, it is allowed to add a required number of feature points to any block which needs additional feature points. Thus, in this case, setting of the order of processing blocks which need addition of feature points and randomization of the arrangement in each group become unnecessary.

In the embodiments described above, to prevent feature points from being concentrated in a particular block, feature points are deleted, by tracking feature points using the KLT method. In the present invention, deleting of feature points may be determined in accordance with the number of feature points evaluated by other methods.

In the embodiments described above, motion vectors are detected by tracking feature points by the KLT method. However, the present invention is not limited to the KLT method, but a wide variety of methods may be employed. That is, motion vectors may be detected by tracking feature points by a method other than the KLT method or may be detected by other arbitrary methods.

In the embodiments described above, camera motion due to hand shake is compensated for by using motion vectors. However, the present invention is not limited to such an application, but the present invention, may be applied to a wide variety of applications such as a security monitor system for detecting an intruder.

It should be understood by those skilled in the art that various modifications, combinations, sub-combinations and alterations may occur depending on design requirements and other factors insofar as they are within the scope of the appended claims or the equivalents thereof.

What is claimed is:

1. A method of detecting motion of a particular part from a sequence of successive input images, comprising the steps of:
   detecting motion vectors of a plurality of parts of the input images by tracking feature points in the successive input images; and
   detecting the motion of the particular part by processing the motion vectors, the motion detection step including producing a histogram of the motion vectors,
      processing the histogram such that a mountain-like distribution segment each having a peak at which a frequency distribution of motion vectors has a maximum in the histogram are classified, and a mountain-like distribution segment corresponding to the particular part is detected,
      defining class information for each feature point to indicate whether each feature point belongs or does not belong to the mountain-like distribution segment detected in the histogram processing step, and
      calculating motion of the particular part by analyzing the motion vectors belonging to the mountain-like distribution segment detected in the histogram processing step, the histogram processing step including,
      detecting the mountain-like distribution segment corresponding to the particular part on the basis of the class information defined for feature points.

2. The motion detection method according to claim 1, wherein the histogram processing step includes segmenting the histogram into a plurality of mountain-like distribution segments by an image region segmentation method and detecting the mountain-like distribution segment corresponding to the particular part.

3. The motion detection method according to claim 1, wherein
the histogram producing step includes producing a histogram with high resolution and a histogram with low resolution, and
the histogram processing step includes detecting a low-resolution mountain-like distribution segment corresponding to the particular part from the low-resolution histogram, and detecting a mountain-like distribution segment corresponding to the low-resolution mountain-like distribution segment from the high-resolution histogram, thereby detecting the mountain-like distribution segment corresponding to the particular part.

4. The motion detection method according to claim 1, wherein the histogram producing step includes
calculating a confidence level indicating reliability of the class information, and
and performing weighting in accordance with the confidence level in producing of the histogram.

5. The motion detection method according to claim 4, wherein the confidence level is given by the number of times that success has been successively achieved in tracking the feature point of interest.

6. The motion detection method according to claim 4, wherein the confidence level is given by the degree of change in distance between the feature point of interest and an adjacent feature point.

7. The motion detection method according to claim 1, wherein the histogram processing step includes
for an initial frame, detecting a mountain-like distribution segment corresponding to the particular part on the basis of the height of mountain-like distribution segments on the histogram, and
for frames following the first frame, detecting a mountain-like distribution segment corresponding to the particular part by evaluating a plurality of mountain-like distribution segments on the histogram in accordance with class information.

8. The motion detection method according to claim 1, wherein
the particular part is a background, and
the histogram processing step includes selecting a mountain-like distribution segment having a greatest height from mountain-like distribution segments in the histogram and setting the selected mountain-like distribution segment as the mountain-like distribution segment corresponding to the particular part for an initial frame.

9. The motion detection method according to claim 1, wherein
the particular part is a background, and
the histogram processing step includes
for an initial frame, selecting a mountain-like distribution segment corresponding to feature points set in a peripheral part of the input image and setting the selected mountain-like distribution segment as the mountain-like distribution segment corresponding to the particular part.

10. The motion detection method according to claim 1, wherein the histogram processing step includes
calculating a peak likelihood for each mountain-like distribution segment on the basis of the class information, the peak likelihood indicating likelihood of being a mountain-like distribution segment corresponding to the particular part, and
selecting a mountain-like distribution segment having greatest peak likelihood as the mountain-like distribution segment corresponding to the particular part.

11. The motion detection method according to claim 10, wherein the peak likelihood is given by the ratio of the number of feature points classified, by the class information, as belonging to the mountain-like distribution segment corresponding to the particular part.

12. The motion detection method according to claim 10, wherein the peak likelihood is given by the product of a value indicating the ratio of the number of feature points classified, by the class information, as belonging to the mountain-like distribution segment corresponding to the particular part and a value obtained by quantizing the height of the mountain-like distribution segment.

13. The motion detection method according to claim 10, wherein the histogram processing step includes
calculating confidence level indicating reliability of the class information, and
weighting the peak likelihoods in accordance with the confidence level.

14. The motion detection method according to claim 13, wherein the confidence level is given by the number of times that success has been successively achieved in tracking the feature point of interest.

15. The motion detection method according to claim 13, wherein the confidence level is given by the degree of change in distance between the feature point of interest and an adjacent feature point.

16. The motion detection method according to claim 1, wherein the motion calculation step includes
evaluating the distance from the center of the mountain-like distribution segment detected in the histogram processing step for each motion vector in the mountain-like distribution segment with respect to a predetermined threshold value, and, if a motion vector whose distance from the center of the mountain-like distribution segment is greater than the predetermined threshold value is detected, removing the detected motion vector so that it will not be processed, and
calculating the average of motion vectors belonging to the mountain-like distribution segment and remaining after the evaluation step, and detecting motion of the particular part from the calculated average of the motion vectors.

17. The motion detection method according to claim 16, wherein the average calculation step includes selecting motion vectors corresponding to the particular part from the motion vectors belonging to the mountain-like distribution segment and remaining after the evaluation step on the basis of the class information, and calculating the average of the selected motion vectors.

18. The motion detection method according to claim 16, wherein the threshold value with respect to which to evaluate the distance is determined in accordance with the standard deviation of motion vectors belonging to the mountain-like distribution segment detected in the histogram processing step.

19. The motion detection method according to claim 16, wherein threshold value with respect to which to evaluate the distance is determined in accordance with a change in the distribution of motion vectors in the mountain-like distribution segment detected in the histogram processing step.

20. The motion detection method according to claim 19, wherein the motion calculation step includes
calculating confidence level indicating reliability of the class information, and
producing the threshold value weighted by the confidence level.

21. The motion detection method according to claim 20, wherein the confidence level is given by the number of times that success has been successively achieved in tracking the feature point of interest.

22. The motion detection method according to claim 20, wherein the confidence level is given by the degree of change in distance between the feature point of interest and an adjacent feature point.

23. The motion detection method according to claim 1, further comprising the steps of:
dividing each frame of the input image into a plurality of blocks;
initially setting a predetermined number of feature points in each block in an initial frame of the input image;
in successive frames following the initial frame of the input image, tracking the feature points to detect the motion vectors; and
correcting unevenness of the distribution of the feature points in the successive frames of the input image.

24. The motion detection method according to claim 1, wherein
the particular part is a background, and
the method further comprising the step of compensating for camera motion due to hand shake on the basis of the motion vectors.

25. A processor which executes a program to implement a method of detecting motion of a particular part from a sequence of successive input images, the program comprising the steps of:
detecting motion vectors of a plurality of parts of the input images by tracking feature points in the successive input images; and
detecting the motion of the particular part by processing the motion vectors
the motion detection step including
producing a histogram of the motion vectors,
processing the histogram such that a mountain-like distribution segment each having a peak at which a frequency distribution of motion vectors has a maximum in the histogram are classified, and a mountain-like distribution segment corresponding to the particular part is detected,
defining class information for each feature point to indicate whether each feature point belongs or does not belong to the mountain-like distribution segment detected in the histogram processing step, and
calculating motion of the particular part by analyzing the motion vectors belonging to the mountain-like distribution segment detected in the histogram processing step, the histogram processing step including
detecting the mountain-like distribution segment corresponding to the particular part on the basis of the class information defined for feature points.

26. A non-transitory computer-readable storage medium in which a program is stored, the program being executable by processing means to implement a method of detecting motion of a particular part from a sequence of successive input images, the program comprising the steps of:
detecting motion vectors of a plurality of parts of the input images by tracking feature points in the successive input images; and
detecting the motion of the particular part by processing the motion vectors, the motion detection step including
producing a histogram of the motion vectors,
processing the histogram such that a mountain-like distribution segment each having a peak at which a frequency distribution of motion vectors has a maximum in the histogram are classified, and a mountain-like distribution segment corresponding to the particular part is detected,
defining class information for each feature point to indicate whether each feature point belongs or does not belong to the mountain-like distribution segment detected in the histogram processing step, and
calculating motion of the particular part by analyzing the motion vectors belonging to the mountain-like distribution segment detected in the histogram processing step, the histogram processing step including
detecting the mountain-like distribution segment corresponding to the particular part on the basis of the class information defined for feature points.

27. A motion detection apparatus configured to detect motion of a particular part from a sequence of successive input images, the apparatus comprising:
a motion vector detection unit configured to detect motion vectors of a plurality of parts of the input images by tracking feature points in the successive input images; and
a motion detection unit configured to detect the motion of the particular part by processing the motion vectors, the motion detection unit including
a histogram producing unit configured to produce a histogram of the motion vectors,
a histogram processing unit configured to process the histogram such that a mountain-like distribution segment each having a peak at which a frequency distribution of motion vectors has a maximum in the histogram are classified, and a mountain-like distribution segment corresponding to the particular part is detected,
a feature point classifying unit configured to classify feature points into a class of feature points belonging to the mountain-like distribution segment detected by the histogram processing unit and a class of the other feature points, and
a motion calculating unit configured to calculate motion of the particular part by analyzing the motion vectors belonging to the mountain-like distribution segment detected by the histogram processing unit, the histogram processing unit configured to detect the mountain-like distribution segment corresponding to the particular part on the basis of the class information defined for feature points.

* * * * *